(12) United States Patent
Nishikawa et al.

(10) Patent No.: US 8,958,355 B2
(45) Date of Patent: Feb. 17, 2015

(54) RADIO BASE STATION APPARATUS, MOBILE TERMINAL APPARATUS AND TRANSMISSION POWER CONTROL METHOD

(75) Inventors: Daisuke Nishikawa, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 396 days.

(21) Appl. No.: 13/378,682

(22) PCT Filed: Jun. 23, 2010

(86) PCT No.: PCT/JP2010/060623
§ 371 (c)(1),
(2), (4) Date: Jan. 27, 2012

(87) PCT Pub. No.: WO2010/150807
PCT Pub. Date: Dec. 29, 2010

(65) Prior Publication Data
US 2012/0127911 A1    May 24, 2012

(30) Foreign Application Priority Data

Jun. 23, 2009 (JP) ................................. 2009-148998

(51) Int. Cl.
*H04H 20/71* (2008.01)
*H04W 52/24* (2009.01)
(Continued)

(52) U.S. Cl.
CPC ............. *H04W 52/242* (2013.01); *H04B 7/024* (2013.01); *H04B 2201/70702* (2013.01);
(Continued)

(58) Field of Classification Search
USPC ........... 370/312, 328–339, 252–253; 375/267
See application file for complete search history.

(56) References Cited

U.S. PATENT DOCUMENTS

| 2007/0004409 | A1 | 1/2007 | Sako et al. | |
| 2010/0246705 | A1* | 9/2010 | Shin et al. | 375/267 |
| 2010/0291936 | A1* | 11/2010 | Zangi et al. | 455/450 |

FOREIGN PATENT DOCUMENTS

WO    2005/025254 A1    3/2005

OTHER PUBLICATIONS

3GPP TR 36.814 V1.6.0; "3rd Generation Partnership Project; Technical Specification Group Radio Access Network; Further Advancements for E-UTRA Physical Layer Aspects"; Jan. 2010 (6 pages).

(Continued)

*Primary Examiner* — Iqbal Zaidi
(74) *Attorney, Agent, or Firm* — Osha Liang LLP

(57) ABSTRACT

To provide a radio base station apparatus, mobile terminal apparatus and transmission power control method for enabling conventional inter-cell interference reduction techniques and ULCoMP to be used together, a radio base station apparatus of the invention is characterized by having a ULCoMP processing section ($2085$) that applies ULCoMP to a mobile terminal ($100_1$) when a difference ($PL_2 - PL_1$) between a pass loss $PL_1$ between the mobile terminal ($100_1$) and a base station apparatus ($200_1$) connected to the mobile terminal ($100_1$) and a pass loss $PL_2$ between the mobile terminal ($100_1$) and a base station apparatus ($200_2$) with the lowest pass loss for the mobile terminal ($100_1$) is within a predetermined range, and a transmission power control section ($2089$) that performs transmission power control for application of ULCoMP when the ULCoMP is applied, while performing transmission power control for non-application of the ULCoMP when the ULCoMP is not applied.

6 Claims, 22 Drawing Sheets

(51) Int. Cl.
  *H04B 7/02*   (2006.01)
  *H04W 52/14*  (2009.01)
  *H04W 52/34*  (2009.01)

(52) U.S. Cl.
  CPC ......... *H04W 52/146* (2013.01); *H04W 52/346* (2013.01); *H04W 52/244* (2013.01); *H04W 52/246* (2013.01); *H04W 52/247* (2013.01); *H04W 52/248* (2013.01)
  USPC ............................ 370/312; 370/328; 375/267

(56) References Cited

OTHER PUBLICATIONS

Decision to Grant issued in corresponding Japanese Application No. 2009-148998, mailed Aug. 28, 2013 (4 pages).

Notification of Reasons for Rejection for Japanese Patent Application No. 2009-148998 mailed May 29, 2012, with English translation thereof (4 pages).

International Search Report w/translation from PCT/JP2010/060623 dated Sep. 21, 2010 (2 pages).

3GPP TS 36.213 V8.7.0; "3rd Generation Partnership Project; Technical Specification Group Radio Access Network; Evolved Universal Terrestrial Radio Access (E-UTRA); Physical layer procedures (Release 8)"; May 2009 (77 pages).

3GPP TSG RAN WG1 Meeting #57, R1-092145; "Uplink coordinated multi-point reception with distributed inter-cell interference suppression for LTE-A"; Alcatel-Lucent Shanghai Bell, Alcatel-Lucent, San Francisco, USA; May 4-8, 2009 (4 pages).

3GPP TS 36.423 V8.4.0; "3rd Generation Partnership Project; Technical Specification Group Radio Access Network; Evolved Universal Terrestrial Radio Access Network (E-UTRAN); X2 application protocol (X2AP) (Release 8)"; Dec. 2008 (89 pages).

* cited by examiner

RADIO BASE STATION APPARATUS, MOBILE TERMINAL APPARATUS AND TRANSMISSION POWER CONTROL METHOD

TECHNICAL FIELD

The present invention relates to a radio base station apparatus, mobile terminal apparatus and transmission power control method for controlling transmission power in uplink CoMP (Uplink Coordinated Multiple Point reception).

BACKGROUND ART

In the LTE (Long Term Evolution) system specified in the 3GPP ($3^{rd}$ Generation Partnership Project), in uplink, SC-FDMA (Single-Carrier Frequency Division Multiple Access) is adopted which achieves low Peak-to-Average Power Ratio (PAPR) and is effective in increasing the coverage. Accordingly, by scheduling in a radio base station apparatus, basically, radio resources of some frequency and time are allocated to one mobile terminal apparatus (UE: User Equipment), and users in the same cell are orthogonal in the frequency and time domains. However, in the LTE system, since the system is based on one-cell frequency reuse, interference from adjacent cells is high, and particularly, the interference level from the UE present at the cell edge is high. Therefore, measures against inter-cell interference are required to compensate for such adjacent-cell interference and maintain certain reception quality.

As the measures against inter-cell interference, the role performed by transmission power control in uplink is significant, and the radio base station apparatus is required to control transmission power of the mobile terminal apparatus to meet predetermined reception quality, while considering pass loss between the user and the radio base station apparatus and interference imposed on adjacent cells. In the LTE system, fractional transmission power control is adopted as the transmission power control method in consideration of inter-cell interference.

Transmission power of signals (PUSCH (Physical Uplink Shared Channel), PUCCH (Physical Uplink Control Channel), SRS (Sounding Reference Signal)) transmitted in uplink in the LTE system is controlled by a combination of open-loop control by parameters that the radio base station apparatus notifies at relatively long intervals and pass loss measured by the mobile terminal apparatus and closed-loop control by TPC commands that the radio base station apparatus notifies at relatively short intervals based on communication status (for example, reception SINR (Signal to Interference plus Noise Ratio) in the radio base station apparatus) between the radio base station apparatus and the mobile terminal apparatus. More specifically, the transmission power of the PUSCH is given by following equation (1) (Non-patent Document 1).

$$P_{PUSCH}(i) = \min\{P_{MAX}, 10 \log_{10}(M_{PUSCH}(i)) + P_{O\_PUSCH}(j) + \alpha \cdot PL + \Delta_{TF}(i) + f(i)\} \quad \text{Eq. (1)}$$

This fractional transmission power control enables inter-cell interference to be reduced by setting target reception power corresponding to pass loss PL of the mobile terminal apparatus (which is achieved by parameter α of open-loop control).

FIG. 25 is a diagram to explain fractional transmission power control. In FIG. 25, the vertical axis represents target reception power ($P_{O\_PUSCH}$), and the horizontal axis represents pass loss (PL). In fractional transmission power control, for the purpose of suppressing inter-cell interference, transmission power is set so as to decrease target reception power of a mobile terminal apparatus present at a cell edge. In other words, since it is considered that the user exists at the cell edge when pass loss (PL) is large and that the user exists near the radio base station apparatus when pass loss is small, the target reception power of the mobile terminal apparatus of the user near the radio base station apparatus is relatively increased, and the target reception power of the mobile terminal apparatus of the user at the cell edge is relatively decreased. The gradient of the primary characteristic line of such a relationship is −(1−α).

Further, as inter-cell interference measurements in uplink, both signalings (signaling via X2 interface between radio base station apparatuses) of "UL Overload Indication (OI)" and "UL High Interference Indication (HII)" are defined in the LTE system (Non-patent Document 2). As shown in FIG. 26, ULOI is used for a radio base station apparatus (adjacent cell) of a high reception interference level to notify an adjacent radio base station apparatus (communicating cell) of the interference level. For example, the radio base station of the cell receiving ULOI performs control for reducing transmission power at the cell edge. Meanwhile, when a mobile terminal apparatus under control is positioned at the cell edge, ULHII is used for the radio base station apparatus to beforehand notify the radio base station apparatus of the adjacent cell of resource block (RB) information allocated to the mobile terminal apparatus. The radio base station apparatus of the adjacent cell receiving the ULHII executes control for performing frequency scheduling to avoid the RBs.

CITATION LIST

Non-Patent Literature

Non-patent Literature 1: 3GPP, TS 36.213, V8.7.0, "Evolved Universal Terrestrial Radio Access (E-UTRA); Physical layer procedures"

Non-patent Literature 2: 3GPP, TS 36.423, V8.4.0, "Evolved Universal Terrestrial Radio Access Network (E-UTRAN); X2 application protocol (X2AP)"

Meanwhile, in the LTE-A (LTE-Advance) system, as further measurements against inter-cell interference, Uplink Coordinated Multiple Point reception (ULCoMP) is scheduled to be adopted (3GPP TR36.814). In the ULCoMP, as shown in FIG. 27, the radio base station apparatus of the cell directly receives a desired signal transmitted from a mobile terminal apparatus, while receiving the desired signal transmitted from the mobile terminal apparatus via a radio base station apparatus of an adjacent cell. In other words, in ULCoMP, since a signal that has conventionally been an interfering signal is used as the desired signal, it is possible to improve uplink reception quality, and particularly, it is expected to improve quality of the mobile terminal apparatus at the cell edge. Particularly, in the LTE-A system, in addition to the conventional independent base station configuration, it is considered using actively remote radio equipment (RRE) that is a radio apparatus in a transmission/reception point positioned away from the main body of the base station, and enhancing the effect of ULCoMP.

However, since the ULCoMP is of techniques of using a conventional interfering signal as a desired signal, there is a risk of reducing gain of ULCoMP in adopting conventional inter-cell interference reduction techniques (fractional transmission power control, UL Overload Indication, UL High Interference Indication) in the LTE system. Further, ULCoMP needs a large processing amount, and is not always applied to all the mobile terminal apparatuses, and it is expected whether or not to apply ULCoMP is dynamically controlled corresponding to a propagation environment of the mobile terminal apparatus. It is necessary to use the conventional inter-cell interference reduction techniques and ULCoMP together, but under present circumstance, the achievement method has not been established.

SUMMARY OF THE INVENTION

The present invention was made in view of such a respect, and it is an object of the invention to provide a radio base station apparatus, mobile terminal apparatus and transmission power control method for enabling the conventional inter-cell interference reduction techniques and ULCoMP to be used together.

A radio base station apparatus of the invention is characterized by having multiple point reception processing means for applying uplink coordinated multiple point reception to a mobile terminal apparatus when a difference ($PL_2-PL_1$) between a first pass loss $PL_1$ between the mobile terminal apparatus and a first radio base station apparatus connected to the mobile terminal apparatus and a second pass loss $PL_2$ between the mobile terminal apparatus and a second radio base station apparatus with the lowest pass loss for the mobile terminal apparatus is within a predetermined range, and transmission power controlling means for performing transmission power control for application of uplink coordinated multiple point reception when the uplink coordinated multiple point reception is applied, while performing transmission power control for non-application of the uplink coordinated multiple point reception when the uplink coordinated multiple point reception is not applied.

A mobile terminal apparatus of the invention is characterized by having uplink coordinated multiple point reception notification signal processing means for receiving a notification signal of application/non-application of uplink coordinated multiple point reception transmitted from a radio base station apparatus, transmission power control parameter receiving means for receiving a transmission power control parameter transmitted from the radio base station apparatus, and transmission power setting means for setting transmission power using a transmission power control parameter different from a transmission power control parameter for non-application of the uplink coordinated multiple point reception, when the uplink coordinated multiple point reception is applied.

A transmission power control method of the invention is characterized by having, in a first radio base station apparatus connected to a mobile terminal apparatus, the steps of applying uplink coordinated multiple point reception to the mobile terminal apparatus when a difference ($PL_2-PL_1$) between a first pass loss $PL_1$ between the mobile terminal apparatus and the first radio base station apparatus and a second pass loss $PL_2$ between the mobile terminal apparatus and a second radio base station apparatus with the lowest pass loss for the mobile terminal apparatus is within a predetermined range, and transmitting a transmission power control parameter of application of the uplink coordinated multiple point reception to the mobile terminal apparatus when the uplink coordinated multiple point reception is applied, while transmitting a transmission power control parameter of non-application of the uplink coordinated multiple point reception to the mobile terminal apparatus when the uplink coordinated multiple point reception is not applied, and in the mobile terminal apparatus, the steps of receiving a transmission power control parameter transmitted from the first radio base station apparatus, and setting transmission power using a transmission power control parameter different from the transmission power control parameter of non-application of the uplink coordinated multiple point reception, when the uplink coordinated multiple point reception is applied.

According to the present invention, since transmission power control for application of uplink coordinated multiple point reception is adopted when uplink coordinated multiple point reception is applied, it is possible to use the conventional inter-cell interference reduction techniques and uplink coordinated multiple point reception together without reducing gain of uplink coordinated multiple point reception.

DETAILED DESCRIPTION

An Embodiment of the invention will specifically be described below with reference to accompanying drawings.

Figure 1:
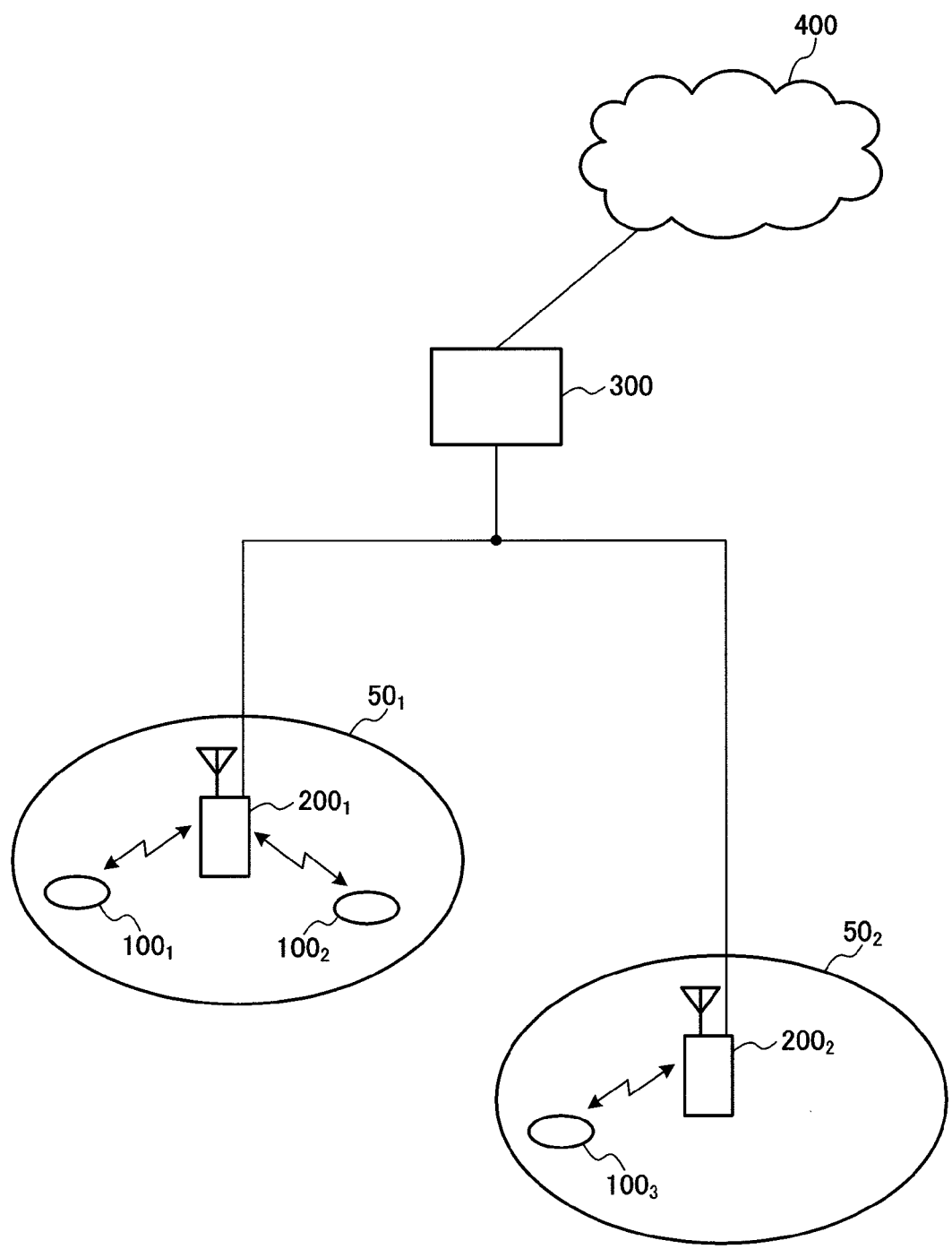
FIG. 1 is a diagram illustrating a radio communication system having radio base station apparatuses and mobile terminal apparatuses according to an Embodiment of the invention.

FIG. 1 is a diagram illustrating a radio communication system having radio base station apparatuses and mobile terminal apparatuses according to an Embodiment of the invention.

The radio communication system is a system to which, for example, E-UTRA (Evolved UTRA and UTRAN) is applied. The radio communication system is provided with base station apparatuses (eNB: e Node B) 200 ($200_1$, $200_2$, ..., $200_I$, I is an integer where I>0) and a plurality of mobile terminals (UE) 100 ($100_1$, $100_2$, $100_3$, ..., $100_n$, n is an integer where n>0) that communicate with the base station apparatuses 200. The base station apparatuses 200 are connected to a higher station, for example, access gateway apparatus 300, and the access gateway apparatus 300 is connected to a core network 400. The mobile terminals $100_n$ communicate with the base station apparatuses 200 in cells 50 ($50_1$, $50_2$) by E-UTRA. In addition, this Embodiment shows two cells, and the invention is similarly applicable to three or more cells. In addition, each mobile terminal ($100_1$, $100_2$, $100_3$, ..., $100_n$) has the same configuration, function and state, and is described as a mobile terminal $100_n$ unless otherwise specified in the following description.

In the radio communication system, as a radio access scheme, OFDMA (Orthogonal Frequency Division Multiplexing Access) is applied in downlink, while SC-FDMA (Single-Carrier Frequency Division Multiple Access) is applied in uplink. Herein, OFDMA is a multicarrier transmission system for dividing a frequency band into a plurality of narrow frequency bands (subcarriers), and mapping data to each subcarrier to perform communication. SC-FDMA is a-single-carrier transmission system for dividing the frequency band for each terminal, so that a plurality of terminals uses mutually different frequency bands, and thereby reducing interference among the terminals.

Described herein are communication channels in E-UTRA. In downlink, used are the Physical Downlink Shared Channel (PDSCH) shared among the mobile terminals $100_n$, and the Physical Downlink Control Channel (PDCCH). The Physical Downlink Control Channel is also called the downlink L1/L2 control channel. User data i.e. normal data signals are transmitted on the Physical Downlink Shared Channel. Further, on the Physical Downlink Control Channel is transmitted downlink scheduling information (DL Scheduling Information), transmittal confirmation information (ACK/NACK) uplink scheduling grant (UL Scheduling Grant), TPC command (Transmission Power Control command), etc. For example, the downlink scheduling information includes an ID of a user who performs communications using the Physical Downlink Shared Channel, information about transport format of the user data i.e. information on the data size, modulation scheme and retransmission control (HARQ: Hybrid ARQ), downlink resource block allocation information, etc.

Meanwhile, for example, the uplink scheduling grant includes an ID of a user who performs communications using the Physical Uplink Shared Channel, information about transport format of the user data i.e. information on the data size and modulation scheme, uplink resource block allocation information, information on transmission power of the shared channel in uplink, etc. Herein, the resource block in uplink corresponds to frequency resources, and is also called the resource unit.

Further, the transmittal confirmation information (ACK/NACK) is transmittal confirmation information concerning the shared channel in uplink. The content of the transmittal confirmation information is represented by Acknowledgement (ACK) indicating that the transmission signal is properly received or Negative Acknowledgement (NACK) indicating that the transmission signal is not properly received.

In uplink, used are the Physical Uplink Shared Channel (PUSCH) shared among the mobile terminals $100_n$, and the Physical Uplink Control Channel (PUCCH). User data i.e. normal data signals are transmitted on the Physical Uplink Shared Channel. Meanwhile, on the Physical Uplink Control Channel is transmitted downlink quality information (CQI: Channel Quality Indicator) used in scheduling processing of the Physical Downlink Shared Channel and adaptive modulation and coding processing (AMC: Adaptive Modulation and Coding scheme), and transmittal confirmation information of the Physical Downlink Shared Channel.

In addition to the CQI and transmittal confirmation information, a scheduling request for requesting resource allocation for the shared channel in uplink, release request in persistent scheduling and the like may be transmitted on the Physical Uplink Control Channel. Herein, resource allocation for the shared channel in uplink means that the base station apparatus notifies the mobile terminal that the mobile terminal is capable of performing communications using the shared channel in uplink in a subsequent subframe, using the Physical Downlink Control Channel of some subframe.

The mobile terminal $100_n$ communicates with an optimal base station apparatus. In the example of FIG. 1, the mobile terminals $100_1$ and $100_2$ communicate with the base station apparatus $200_1$, and the mobile terminal $100_3$ communicates with the base station apparatus $200_2$. At this point, uplink transmission of the mobile terminals $100_1$ and $100_2$ interferes with the base station apparatus $200_2$ that is an adjacent cell. The adjacent cell interference considerably varies because mobile terminals assigned transmission are varied for each TTI (Transmission Time Interval) and for each RB (Resource Block) by uplink packet scheduling.

Therefore, to reduce interference on the radio base station $200_2$, for signals transmitted in uplink, the transmission power is controlled by a combination of open-loop control by parameters that the radio base station apparatus notifies at relatively long intervals and pass loss measured by the mobile terminal apparatus and closed-loop control by TPC commands that the radio base station apparatus notifies at relatively short intervals based on communication status between the radio base station apparatus and the mobile terminal apparatus.

Further, the base station apparatus $200_2$ notifies the base station apparatus $200_1$ that the reception interference level is high, using ULOI. After receiving the ULOI, the base station apparatus $200_1$ performs control for decreasing transmission power at the cell edge. Further, when mobile terminals $100_1$ and $100_2$ under control are positioned at the cell edge, the base station apparatus $200_1$ beforehand notifies the base station apparatus $200_2$ of the adjacent cell of the information of resource blocks (RBs) allocated to the mobile terminals $100_1$ and $100_2$, using ULHII. The base station apparatus $200_2$ of the adjacent cell receiving the ULHII executes control for performing frequency scheduling to avoid the RBs.

Furthermore, in the radio communication system, as further inter-cell interference measurements, it is possible to also apply Uplink Coordinated Multiple Point reception (UL-CoMP). In the ULCoMP, the base station apparatus $200_1$ connected to the mobile terminal $100_2$ receives a desired signal from the mobile terminal $100_2$ via the base station apparatus $200_2$ of the adjacent cell. In other words, the base station apparatus $200_1$ and base station apparatus $200_2$ in a plurality of cells receive the desired signal from the mobile terminal $100_2$.

In the radio communication system as shown in FIG. 1, it is possible to use the inter-cell interference reduction techniques (fractional transmission power control, ULOI and ULHII) in the LTE system and ULCoMP together, but when the inter-cell interference reduction techniques are applied and ULCoMP is further applied, as described previously, there is a risk of reducing gain of ULCoMP. Further, for ULCoMP, it is desirable to dynamically control the presence or absence of application corresponding to a propagation environment of the mobile terminal.

Therefore, as a result of repeated keen studies to solve the problem occurring in using both the inter-cell interference reduction techniques in the LTE system and ULCoMP, the inventors of the invention found that it is possible to prevent reductions in ULCoMP gain in applying ULCoMP by using transmission power control different from transmission power control of non-application of ULCoMP, in applying ULCoMP, and made the present invention. In other words, when ULCoMP is applied, a mobile terminal of a user at the cell edge undergoes transmission power control (transmission power control for enhancing gain of ULCoMP) for enhancing the effect of ULCoMP, and when ULCoMP is not applied, a mobile terminal of a user at the cell edge undergoes transmission power control for reducing inter-cell interference.

Using transmission power control different from transmission power control of non-application of ULCoMP in applying ULCoMP means varying a transmission power control parameter when ULCoMP is applied and a transmission power control parameter when ULCoMP is not applied. Herein, the transmission power control parameter is parameters, such as an attenuation coefficient α and pass loss PL of the α·PL term of above-mentioned Eq. (1) in fractional transmission power control, $P_{O\_PUSCH}(j)$ of above-mentioned Eq. (1), TPC command, ULOI and ULHII, used in transmission power control in the inter-cell interference reduction techniques in the LTE system.

In the transmission power control method of the invention, in applying ULCoMP, in the case of using transmission power control different from transmission power control of non-application of ULCoMP, the connected base station apparatus notifies the mobile terminal to apply ULCoMP of application of ULCoMP, when necessary. Further, inversely, the base station apparatus also notifies the mobile terminal to which ULCoMP is applied of non-application of ULCoMP (release from the ULCoMP state).

Figure 2:
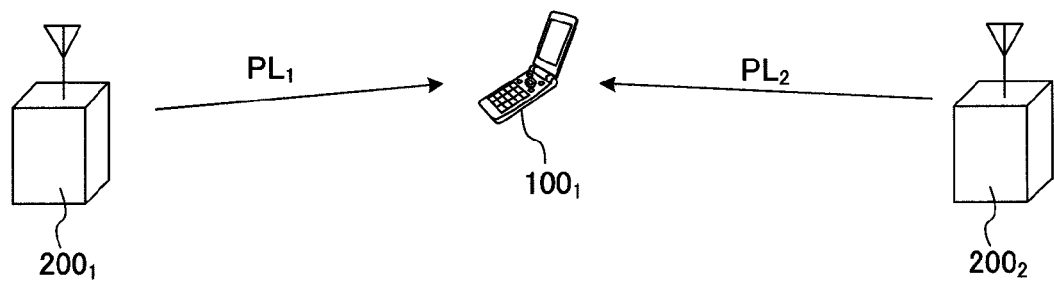
FIG. 2 is a diagram to explain a transmission power control method according to the Embodiment of the invention.

For example, whether or not to apply ULCoMP is determined as described below. As shown in FIG. 2, when a pass loss difference $PL_{Diff}(=PL_2-PL_1)$ between a pass loss value $PL_1$ between the mobile terminal $100_1$ and the base station apparatus $200_1$ of the connected cell and a pass loss value $PL_2$ between the mobile terminal $100_1$ and the base station apparatus $200_2$ (base station apparatus of the ULCoMP coordinated cell) of the adjacent cell with the lowest pass loss is within a predetermined threshold X dB, the base station apparatus $200_1$ of the connected cell applies ULCoMP to the mobile terminal $100_1$. In addition, the base station apparatus $200_1$ obtains the pass loss difference $PL_{Diff}$. In this case, the base station apparatus $200_1$ acquires the pass loss value $PL_2$ from the base station apparatus $200_2$ by X2 interface. However, the method of acquiring the pass loss value $PL_2$ in the base station apparatus $200_1$ is not limited thereto, and for example, the base station apparatus $200_1$ may acquire the value from the mobile terminal $100_1$ connected to the base station apparatus $200_1$. Alternately, the mobile terminal $100_1$ may calculate the pass loss difference $PL_{Diff}$ to notify the base station apparatus $200_1$ of the connected cell of $PL_{Diff}$. In addition, the base station apparatus $200_2$ of the ULCoMP coordinated cell may be the same base station apparatus as the base station apparatus $200_1$ of the connected cell. Further, the determination on ULCoMP application/non-application is not limited thereto, and is capable of being modified as appropriate.

The information on ULCoMP application/non-application is notified to the mobile terminal to apply ULCoMP, for example, using Higher layer signaling via the PDSCH. More specifically, when non-application of ULCoMP is changed to application of ULCoMP, "1" is signaled, while application of ULCoMP is changed to non-application of ULCoMP, "0" is signaled. Further, the information on ULCoMP application/non-application is notified to the mobile terminal to apply ULCoMP, for example, using L1/L2 signaling via the PDCCH. More specifically, in application of ULCoMP, "1" is (always) notified, while in non-application of ULCoMP, "0" is (always) notified. In addition, notification of the information on ULCoMP application/non-application is not limited thereto, and is capable of being modified as appropriate.

In the transmission power control method of the invention, there are the following aspects as an aspect of using transmission power control different from transmission power control of non-application of ULCoMP in applying ULCoMP.

(Aspect 1)

In this aspect, the value of the attenuation coefficient α of the α·PL term of above-mentioned Eq. (1) in fractional transmission power control is changed between application of ULCoMP and non-application of ULCoMP (two attenuation coefficients are prepared). In other words, it is made possible to set the mobile terminal to apply ULCoMP separately for a value of the attenuation coefficient α in fractional transmission power control. For the mobile terminal to apply ULCoMP, it is not necessary to decrease the transmission power so as not to reduce ULCoMP gain. Therefore, for the mobile terminal to apply ULCoMP, the effect of ULCoMP is enhanced by increasing the value of the attenuation coefficient α.

Figure 3:
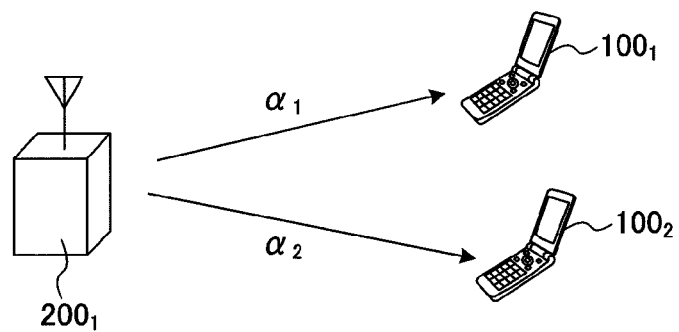
FIG. 3 is a diagram to explain an aspect 1 of the transmission power control method according to the Embodiment of the invention.

In this aspect, as shown in FIG. 3, used are an attenuation coefficient $α_1$ for the mobile terminal $100_1$ to apply ULCoMP and an attenuation coefficient $α_2$ for the mobile terminal $100_2$ not to apply ULCoMP. The attenuation coefficients $α_1$ and $α_2$ may be notified via the PBCH (Physical Broadcast Channel), may be separately notified by Higher layer signaling via the PDSCH, or may be separately notified by L1/L2 signaling via the PDCCH. In the case of notifying of the attenuation coefficients $α_1$ and $α_2$ via the PBCH, for example, a value of the attenuation coefficient $α_1$ for application of ULCoMP may be larger than a value of the attenuation coefficient $α_2$ for non-application of ULCoMP, or may be set at a fixed value of 1.0. Further, in the case of notifying of the attenuation coefficients $α_1$ and $α_2$ via the PDSCH or PDCCH, the same attenuation coefficient $α_1$ may be notified to all ULCoMP applied mobile terminals, or different attenuation coefficients $α_1$ may be notified for each mobile terminal. In addition, in the case of notifying of the attenuation coefficients $α_1$ and $α_2$ via the PBCH, as described previously, it is necessary to notify the mobile terminal of the information on ULCoMP application/non-application.

(Aspect 2)

In this aspect, the value of the pass loss PL of the α·PL term of above-mentioned Eq. (1) in fractional transmission power control is changed between application of ULCoMP and non-application of ULCoMP. In fractional transmission power control, the transmission power is weighted with the attenuation coefficient α with respect to the pass loss value $PL_1$ between the mobile terminal $100_1$ and the base station apparatus $200_1$ of the connected cell. Therefore, applied is a combined value $PL_{CoMP}$ obtained from $PL_1$ and the pass loss value $PL_2$ between the mobile terminal $100_1$ and the base station apparatus $200_2$ of the ULCoMP coordinated cell. When a value larger than $PL_1$ is applied as $PL_{CoMP}$, since the value of the α·PL term of above-mentioned Eq. (1) is increased, it is possible to enhance the ULCoMP effect. Alternatively, when a value smaller than $PL_1$ is used as $PL_{CoMP}$, it is possible to suppress adjacent cell interference provided by the mobile terminal $100_1$ to which ULCoMP is applied.

Figure 4:
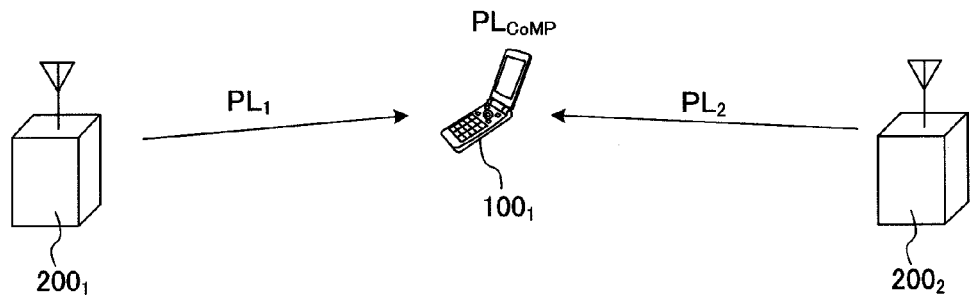
FIG. 4 is a diagram to explain an aspect 2 of the transmission power control method according to the Embodiment of the invention.

In this aspect, as shown in FIG. 4, the combined value $PL_{CoMP}$ (combined value of pass losses) is obtained using the pass loss value $PL_2$ between the mobile terminal $100_1$ and the base station apparatus $200_2$ of the ULCoMP coordinated cell. The transmission power of the mobile terminal $100_1$ is obtained using the combined value $PL_{CoMP}$. For example, the transmission power of the ULCoMP applied mobile terminal $100_1$ may be increased by setting that $PL_{CoMP}=(PL_1+PL_2)/2$ so that $PL_{CoMP}$ is a value larger than the value of $PL_1$ that is usually applied in transmission power calculation. Inversely, as $PL_{CoMP}=PL_1·PL_2/(PL_1+PL_2)$ (the value is converted into a true value, calculated, and finally, converted in terms of dB), the value is set at a value smaller than the value of $PL_1$ that is usually applied in transmission power calculation, and suitable transmission power in consideration of adjacent cell interference may be set, although the transmission power is decreased. In addition, the method of obtaining the combined value $PL_{CoMP}$ is not limited particularly. Further, in this aspect, as described previously, it is necessary to notify the mobile terminal of the information on ULCoMP application/non-application.

(Aspect 3)

In this aspect, values of the pass loss PL and pass loss difference $PL_{Diff}$ of the mobile terminal for the base station apparatus to apply to transmission power control are changed between application of ULCoMP and non-application of ULCoMP. The base station apparatus sets target reception power $P_{Rx}$ or target reception SINR ($T_{SINR}$) of the mobile terminal, using the pass loss difference $PL_{Diff}$ between the mobile terminal and the base station apparatus of the adjacent cell with the lowest pass loss.

$$P_{Rx}=Px+β·PL_{Diff}+γ \qquad \text{Eq. (2)}$$

Px: reception power reference value, β: pass loss difference correction coefficient, γ: offset $$T_{SINR}=Tx+β·PL_{Diff}+γ \qquad \text{Eq. (3)}$$

Figure 5:
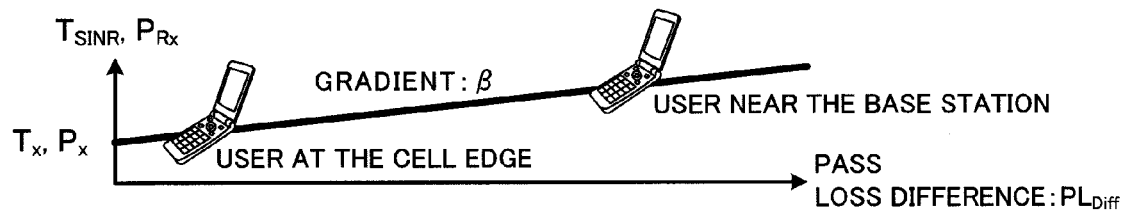
FIG. 5 is a diagram to explain an aspect 3 of the transmission power control method according to the Embodiment of the invention.

Tx: target reception SINR reference value, β: pass loss difference correction coefficient, γ: offset Herein, as shown in FIG. 5, the pass loss difference correction coefficient β is explained from the target reception power ($P_{Rx}$), target reception SINR ($T_{SINR}$) and pass loss difference $PL_{Diff}$. In the relationship as shown in FIG. 5, for the purpose of suppressing inter-cell interference, the mobile terminal present at the cell edge is set for low target reception power or low target reception SINR. In other words, since it is considered that a user exists near the base station apparatus when the pass loss difference ($PL_{Diff}$) is large, and that a user exists at the cell edge when the pass loss is small, the target reception power or target reception SINR of the mobile terminal of the user near the base station apparatus is relatively increased, and the target reception power or target reception SINR of the mobile terminal of the user at the cell edge is relatively decreased. The gradient of the primary characteristic line of such a relationship is β. For example, in consideration of consistency with equation (1) of fractional transmission power control, it can be set that β=1−α, but is not limited thereto.

In this aspect, instead of setting the equation of $PL_{Diff}=PL_2−PL_1$, for example, the ULCoMP applied mobile terminal is set for the equation of $PL_{Diff}=PL_3−PL_{CoMP}$. Herein, $PL_{CoMP}$ is the same as $PL_{CoMP}$ in the aspect 2. Further, the pass loss value $PL_3$ represents a pass loss between the mobile terminal and the base station apparatus of the adjacent cell with the lowest pass loss except the ULCoMP coordinated cell. By thus varying the $PL_{Diff}$, it is possible to set mainly the ULCoMP applied mobile terminal existing at the cell edge for a high level of target reception power or target reception SINR, and to enhance the effect of ULCoMP. In addition, with respect to $PL_{CoMP}$, setting at a value smaller than conventional $PL_1$ is advantageous, from the viewpoint of reliably increasing the target reception power and target reception SINR.

For example, the base station apparatus reflects a difference between the measured reception power and $P_{Rx}$ obtained in Eq. (2) and/or a difference between the measured reception SINR and $T_{SINR}$ obtained in Eq. (3) in a TPC command and/or $P_{O\_PUSCH}$ to notify the mobile terminal in closed loop. Accordingly, in this aspect, transmission power control is performed with the target reception power and target reception SINR obtained by varying $PL_{Diff}$. In addition, in this aspect, it is not necessary to notify the mobile terminal of the information on ULCoMP application/non-application.

(Aspect 4)

Figure 6:
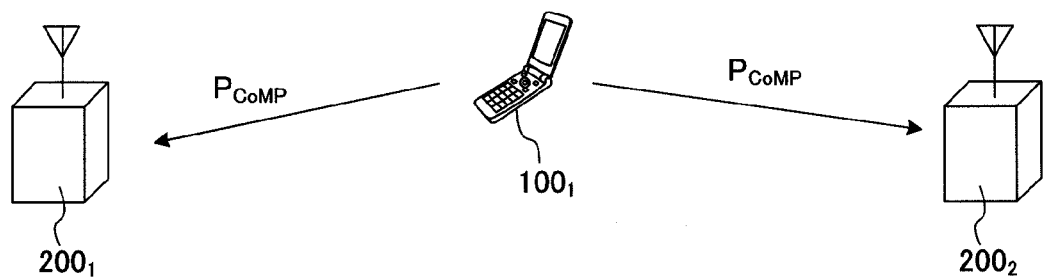
FIG. 6 is a diagram to explain an aspect 4 of the transmission power control method according to the Embodiment of the invention.

In this aspect, the transmission power of fractional transmission power control is changed between application of ULCoMP and non-application of ULCoMP. In the mobile terminal to apply ULCoMP, final transmission power is set from the transmission power obtained from the pass loss between the mobile terminal and the base station apparatus of the connected cell, and the transmission power obtained from the pass loss between the mobile terminal and the base station apparatus of the ULCoMP coordinated cell. In fractional transmission power control in the LTE system, applied is transmission power $P_1$ calculated from the pass loss value $PL_1$ for the connected cell. In this aspect, as shown in FIG. 6, the final transmission power is set at $P_{CoMP}$ with consideration given to the transmission power $P_1$ calculated from the pass loss value $PL_1$ between the mobile terminal $100_1$ and the base station apparatus $200_1$ of the connected cell, and the transmission power $P_2$ (that is generally a larger value than $P_1$) calculated from the pass loss value $PL_2$ between the mobile terminal $100_1$ and the base station apparatus $200_2$ of the ULCoMP coordinated cell. By this means, since the transmission power value in fractional transmission power control is increased in applying ULCoMP, it is possible to enhance the effect of ULCoMP.

In this aspect, for example, in applying ULCoMP, in the mobile terminal $100_1$, an average value, which is obtained from the transmission power $P_1$ calculated using the pass loss value $PL_1$ between the mobile terminal $100_1$ and the base station apparatus $200_1$ of the connected cell, and the transmission power $P_2$ calculated using the pass loss value $PL_2$ between the mobile terminal $100_1$ and the base station apparatus $200_2$ of the ULCoMP coordinated cell, may be transmission power $P_{CoMP}$ (combined value of transmission power: $P_{CoMP}=(P_1+P_2)/2$), or the transmission power $P_2$ may be transmission power $P_{CoMP}$ ($P_{CoMP}=P_2$) without modification. Further, in this aspect, as described above, it is necessary to notify the mobile terminal of the information on ULCoMP application/non-application.

(Aspect 5)

In this aspect, the range or the number of bits of a transmission power control command (TCP command) in UL scheduling grant is changed between application of ULCoMP and non-application of ULCoMP. In other words, for the mobile terminal to apply ULCoMP, the range or the number of bits of the transmission power control command (TCP command) in UL scheduling grant is increased. By thus increasing the range of the TPC command, it is possible to promptly respond to variations in the target reception power mainly in switching the ULCoMP application.

Figure 7:
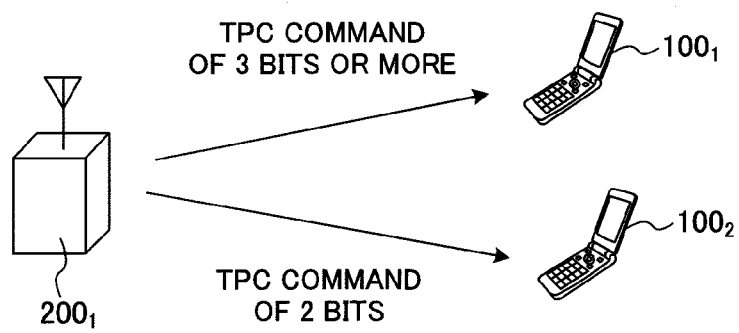
FIG. 7 is a diagram to explain an aspect 5 of the transmission power control method according to the Embodiment of the invention.

In this aspect, for example, as shown in FIG. 7, the base station apparatus $200_1$ of the connected cell transmits the TPC command of 3 bits or more in UL scheduling grant to the ULCoMP applied mobile terminal $100_1$, while transmitting the TPC command ($\{-1, 0, +1, +3\}$ dB) of 2 bits in UL scheduling grant to the ULCoMP non-applied mobile terminal $100_2$. The TPC command of 3 bits includes $\{-5, -3, -1, 0, +1, +3, +5, +7\}$ dB, $\{-3, -1, 0, +1, +3, +5, +7, +9\}$ dB and the like.

Further, the base station apparatus $200_1$ of the connected cell transmits a TPC command of which the range is increased to the ULCoMP applied mobile terminal $100_1$ in UL scheduling grant, while transmitting the TPC command ($\{-1, 0, +1, +3\}$ dB) of the normal range to the ULCoMP non-applied mobile terminal $100_2$ in UL scheduling grant. The TPC command of the increased range includes $\{0, +1, +3, +5\}$ dB, $\{0, +2, +4, +6\}$ dB, etc. (2 bits). In this aspect, the mobile terminal $100_1$ needs to identify the content of the TPC command. Therefore, the base station apparatus beforehand notifies of the content of the TPC command of 3 bits and the TPC command of the increased range, for example, as TPC-Index, separately using Higher layer signaling. Further, as described previously, it is necessary to notify the mobile terminal of the information on ULCoMP application/non-application, and when the TPC-Index for instructing the TPC command of 3 bits or the TPC command of the increased range is notified by Higher layer signaling, the mobile terminal may identify that ULCoMP is applied, irrespective of the presence or absence of the information on ULCoMP application/non-application.

(Aspect 6)

In this aspect, in the case where a change occurs in the ULCoMP applied mobile terminal (in the case where the number of ULCoMP applied mobile terminals is increased or decreased due to ULCoMP application ⇔ ULCoMP non-application), the base station apparatus updates the ULOI and ULHII. The ULOI and ULHII in the LTE system are to impose restrictions on transmission power control and scheduling of the adjacent cell, and when ULCoMP is applied, there is a possibility that the restrictions reduce the effect ULCoMP, particularly, immediately after transition. Therefore, in this aspect, in applying ULCoMP, signalings of ULOI and ULHII are updated. By this means, even immediately after transition, it is possible to enhance the effect of ULCoMP in application of ULCoMP.

Figure 8:
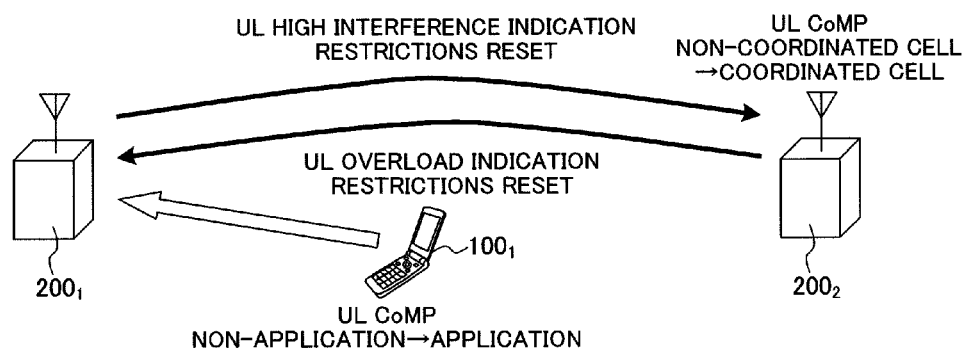
FIG. 8 is a diagram to explain an aspect 6 of the transmission power control method according to the Embodiment of the invention.

In this aspect, as shown in FIG. 8, in the case where a change occurs in the ULCoMP applied mobile terminal $100_1$, herein, in the case of ULCoMP non-application ULCoMP application (in the case where the number of ULCoMP applied mobile terminals is increased), when a change occurs in the content of ULOI and ULHII, the changed content is notified to the base station apparatus of the adjacent cell. In other words, when the need of restrictions by ULHII is eliminated, the base station apparatus $200_1$ of the connected cell notifies the base station apparatus $200_2$ which is of the adjacent cell and becomes the ULCoMP coordinated cell of the ULHII with the content indicative of reset of restrictions. Further, when the need of restrictions by ULOI is eliminated, the base station apparatus $200_2$ which is of the adjacent cell and becomes the ULCoMP coordinated cell notifies the base station apparatus $200_1$ of the connected cell of the ULOI with the content of reset of restrictions. In addition, in this aspect, the base station apparatus $200_2$ which becomes the ULCoMP coordinated cell does not need to notify the mobile terminal of the information on ULCoMP application/non-application. In addition, in the above-mentioned description, the case is described where the ULOI and ULHII are both used in the radio communication system, but the invention is not limited thereto, and the system may use either the ULOI or ULHII.

(Aspect 7)

In this aspect, when ULCoMP is applied to a mobile terminal such that radio-based Overload Indicator (OLI) is applied to transmission power control, the mobile terminal is notified of reset of restrictions of OLI. In this case, it is assumed that the base station apparatus transmits the OLI directly (on a radio-base) to the mobile terminal under control of the adjacent cell, and that the mobile terminal performs transmission power control according to the OLI. By this means, as in the aspect 6, even immediately after transition, it is possible to enhance the effect of ULCoMP in applying ULCoMP. In addition, with respect to transmission power control such that the base station apparatus transmits the OLI directly (on a radio-base) to the mobile terminal under control of the adjacent cell, and that the mobile terminal performs transmission power control according to the OLI, the Applicant of the invention already proposed the transmission power control in WO2008/044528, entire content of which is expressly incorporated by reference herein.

Figure 9:
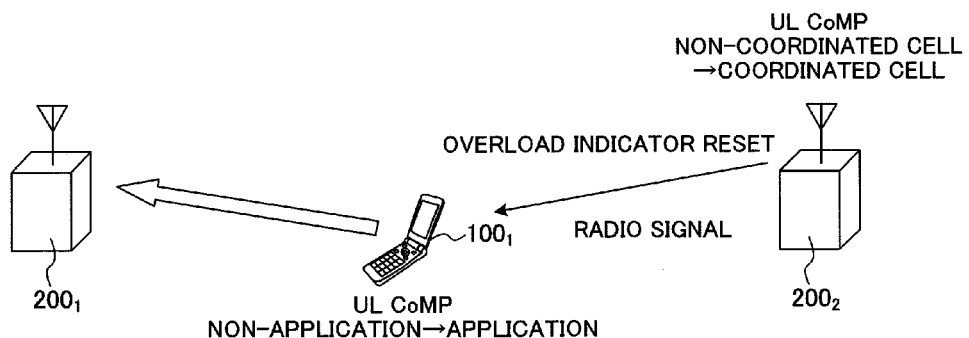
FIG. 9 is a diagram to explain an aspect 7 of the transmission power control method according to the Embodiment of the invention.

In this aspect, as shown in FIG. 9, in the case where a change occurs in the ULCoMP applied mobile terminal $100_1$ that communicates with the base station apparatus $200_1$ of the connected cell, herein, in the case of ULCoMP non-application ULCoMP application, the base station apparatus $200_2$ which is of the adjacent cell and becomes the ULCoMP coordinated cell transmits a radio signal indicative of reset of OLI to the mobile terminal $100_1$. Herein, as a radio signal indicative of reset of OLI, for example, there is a radio signal such that the offset term of transmission power to the mobile terminal $100_1$ is zero, or the like. In addition, in this aspect, it is not necessary to notify the mobile terminal of the information on ULCoMP application/non-application.

Figure 10:
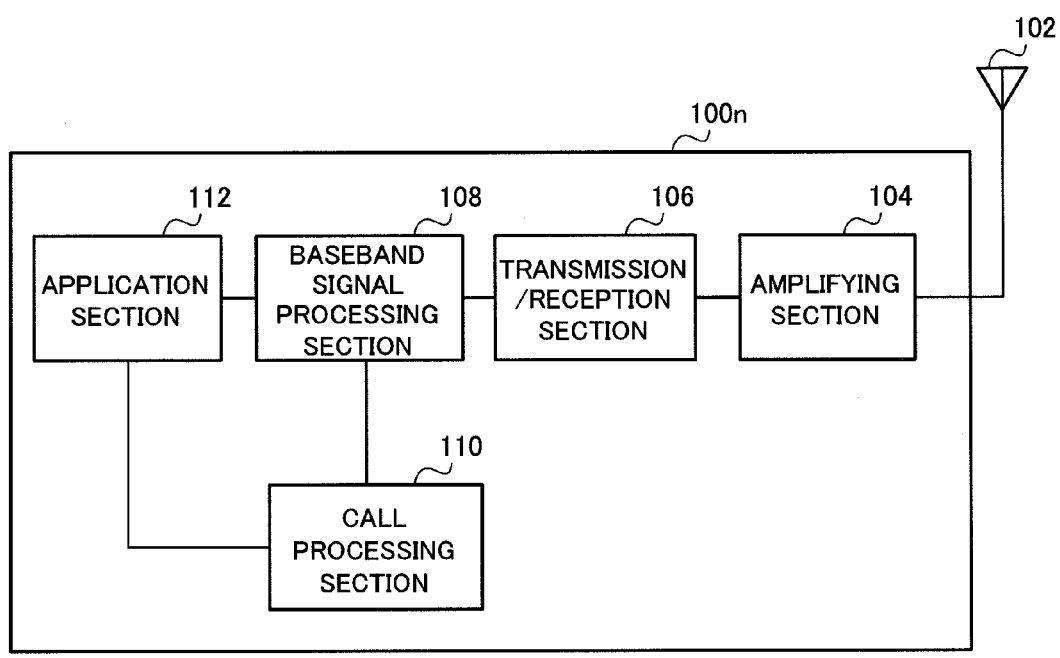
FIG. 10 is a block diagram illustrating a schematic configuration of a mobile terminal apparatus according to the Embodiment of the invention.

FIG. 10 is a block diagram illustrating a schematic configuration of the mobile terminal apparatus according to the Embodiment of the invention.

The mobile terminal $100_n$ as shown in FIG. 10 is mainly comprised of an antenna 102, amplifying section 104, transmission/reception section 106, baseband signal processing section 108, call processing section 110 and application section 112.

In the mobile terminal $100_n$ with such a configuration, with respect to downlink data, a radio frequency signal received in the antenna 102 is amplified in the amplifying section 104 so that the reception power is corrected to certain power under AGC (Auto Gain Control). The amplified radio frequency signal is frequency-converted into a baseband signal in the transmission/reception section 106. The baseband signal is subjected to predetermined processing (error correction, decoding, etc.) in the baseband signal processing section 108, and then, is output to the call processing section 110 and application section 112. The call processing section 110 performs management of communications with the base station apparatus 200 and the like, and the application section 112 performs processing concerning the layer higher than the physical layer and MAC layer, and the like.

Uplink data is input from the application section 112 to the baseband signal processing section 108. The baseband signal processing section 108 performs processing of retransmission control, scheduling, transmission format selection, channel coding and the like on the data to transfer to the transmission/reception section 106. The transmission/reception section 106 frequency-converts the baseband signal output from the baseband signal processing section 108 into a radio frequency signal. Then, the frequency-converted signal is amplified in the amplifying section 104, and transmitted from the antenna 102.

Figure 11:
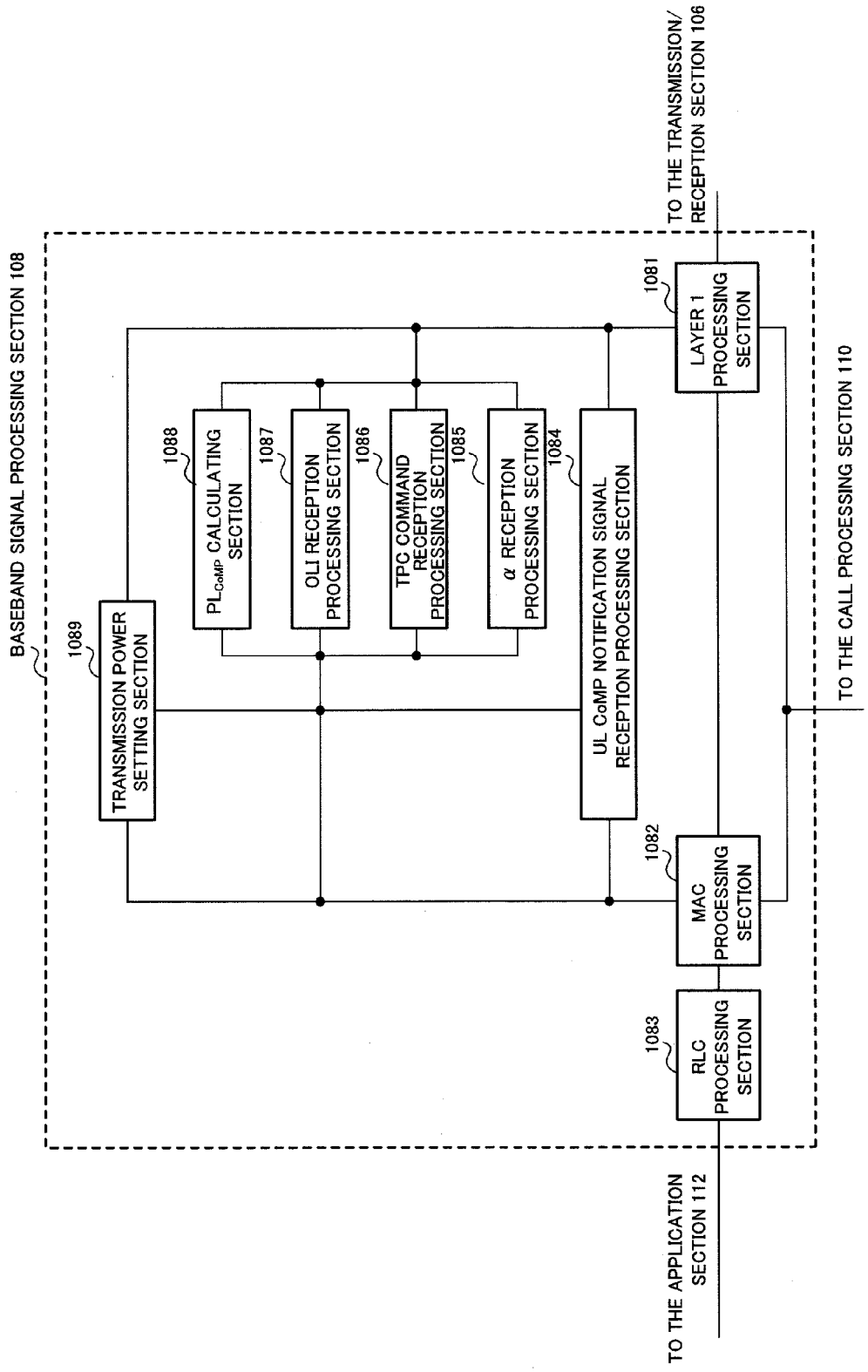
FIG. 11 is a block diagram illustrating a configuration of a baseband signal processing section in the mobile terminal apparatus as shown in FIG. 10.

FIG. 11 is a block diagram illustrating a configuration of the baseband signal processing section in the mobile terminal apparatus as shown in FIG. 10.

The baseband signal processing section 108 is mainly comprised of a layer 1 processing section 1081, MAC (Medium Access Control) processing section 1082, RLC (Radio Link Control) processing section 1083, ULCoMP notification signal reception processing section 1084, a reception processing section 1085, TPC command reception processing section 1086, OLI reception processing section 1087, $PL_{CoMP}$ calculating section 1088, and transmission power setting section 1089. In addition, the α reception processing section 1085, TPC command reception processing section 1086, and OLI reception processing section 1087 are of a transmission power control parameter receiving section that receives a transmission power control parameter transmitted from the base station apparatus.

The layer 1 processing section 1081 performs mainly the processing concerning the physical layer. For example, the layer 1 processing section 1081 performs, on a signal received in downlink, processing such as channel decoding, Discrete Fourier Transform (DFT), frequency demapping, Inverse Fast Fourier Transform (IFFT), and data demodulation. Further, the layer 1 processing section 1081 performs, on a signal to transmit in uplink, processing such as channel coding, data modulation, frequency mapping, and Inverse Fast Fourier Transform (IFFT).

The MAC processing section 1082 performs retransmission control (HARQ) in the MAC layer for the signal received in downlink, analysis of downlink scheduling information (identification of the transmission format of the PDSCH, and identification of resource blocks of the PDSCH) and the like. Further, the MAC processing section 1082 performs processing such as MAC retransmission control for the signal to transmit in uplink, and analysis of uplink scheduling information (identification of the transmission format of the PUSCH, and identification of resource blocks of the PUSCH).

The RLC processing section 1083 performs segmentation of packets, concatenation of packets, retransmission control in the RLC layer and the like on packets received in downlink and packets to transmit in uplink.

The ULCoMP notification signal reception processing section 1084 receives a ULCoMP notification signal notified from the base station apparatus of the connected cell, and determines the content (ULCoMP application/ULCoMP non-application) of the ULCoMP notification signal. The information of the ULCoMP notification signal is output to the transmission power setting section 1089, while being output to the $PL_{CoMP}$ calculating section 1088, TPC command reception processing section 1086 or α reception processing section 1085. In addition, the ULCoMP signal is transmitted on the PDSCH and PDCCH in downlink.

The α reception processing section 1085 receives a signal of the attenuation coefficient α that is a parameter used in transmission power control, notified from the base station apparatus, and determines the content of the signal. The information of the attenuation coefficient α is output to the transmission power setting section 1089. The α reception processing section 1085 receives an attenuation coefficient $α_1$ of ULCoMP application in application of ULCoMP (when the information of the ULCoMP notification signal is received), while receiving an attenuation coefficient $α_2$ of ULCoMP non-application in non-application of ULCoMP. The α reception processing section 1085 outputs the attenuation coefficient $α_1$ and attenuation coefficient $α_2$ to the transmission power setting section 1089.

The TPC command reception processing section 1086 receives a TPC command notified from the base station apparatus, and determines the content of the TPC command. The information of the TPC command is output to the transmission power setting section 1089. The TPC command reception processing section 1086 receives the TPC command (for example, TPC command of 3 bits) of ULCoMP application in application of ULCoMP (when the information of the ULCoMP notification signal is received), while receiving the TPC command (two-bit TPC command) of ULCoMP non-application in non-application of ULCoMP. The TPC command reception processing section 1086 outputs the TPC command to the transmission power setting section 1089.

The OLI reception processing section 1087 receives OLI notified from the base station apparatus of the adjacent cell, and determines the content (OLI restrictions imposed, OLI restrictions reset) of the OLI. The information of the OLI is output to the transmission power setting section 1089. The OLI reception processing section 1087 receives the OLI of OLI restrictions reset in application of ULCoMP, while receiving the OLI (normal OLI) of OLI restrictions imposed in non-application of ULCoMP.

The $PL_{CoMP}$ calculating section 1088 calculates a pass loss value used in transmission power control. The information of $PL_{CoMP}$ is output to the transmission power setting section 1089. In application of ULCoMP (when the information of the ULCoMP notification signal is received), the $PL_{CoMP}$ calculating section 1088 calculates the $PL_{CoMP}$ using a pass loss $PL_1$ between the mobile terminal and the base station apparatus 200 of the connected cell and a pass loss $PL_2$ between the mobile terminal and the base station apparatus of the ULCoMP coordinated cell (base station apparatus with the lowest pass loss for the mobile terminal). The $PL_{CoMP}$ calculating section 1088 outputs the $PL_{CoMP}$ to the transmission power setting section 1089. In this case, the pass loss $PL_1$ is pass loss obtained in the mobile terminal, the pass loss $PL_2$ is pass loss obtained in the mobile terminal or pass loss acquired by X2 interface from the base station apparatus of the ULCoMP coordinated cell via the base station apparatus of the connected cell, and each pass loss is output to the $PL_{CoMP}$ calculating section 1088. In non-application of ULCoMP, the pass loss $PL_1$ is output to the transmission power setting section 1089.

The transmission power setting section 1089 sets the transmission power using a transmission power control parameter. In other words, the transmission power setting section 1089 sets the transmission power using a transmission power control parameter different from a transmission power control parameter of non-application of ULCoMP in application of ULCoMP, and sets the transmission power using the transmission power control parameter of non-application of ULCoMP in non-application of ULCoMP.

The transmission power setting section 1089 sets the transmission power based on above-mentioned equation (1) using the attenuation coefficient $\alpha_1$ of ULCoMP application output from the $\alpha$ reception processing section 1085 in application of ULCoMP (when the information of the ULCoMP notification signal is received), and sets the transmission power based on above-mentioned equation (1) using the attenuation coefficient $\alpha_2$ of ULCoMP non-application in non-application of ULCoMP (Aspect 1).

The transmission power setting section 1089 sets the transmission power based on above-mentioned equation (1) using the pass loss $PL_{CoMP}$ output from the $PL_{CoMP}$ calculating section 1088, instead of the pass loss $PL_1$ between the mobile terminal and the connected base station apparatus, as pass loss of ULCoMP application in application of ULCoMP (when the information of the ULCoMP notification signal is received), and sets the transmission power based on above-mentioned equation (1) using the pass loss $PL_1$ between the mobile terminal and the connected base station apparatus, as pass loss of ULCoMP non-application in non-application of ULCoMP (Aspect 2).

In application of ULCoMP (when the information of the ULCoMP notification signal is received), the transmission power setting section 1089 sets the transmission power $P_{CoMP}$ using the transmission power $P_1$ obtained based on the above-mentioned equation (1) using the pass loss $PL_1$ between the mobile terminal and the connected base station apparatus, and the transmission power $P_2$ obtained based on the above-mentioned equation (1) using the pass loss $PL_2$ between the mobile terminal and the base station apparatus of the ULCoMP coordinated cell (Aspect 4).

The transmission power setting section 1089 sets the transmission power using a TPC command of a higher number of bits and a larger range than in the TPC command of non-application of ULCoMP output from the TPC command reception processing section 1086 in application of ULCoMP (when the information of the ULCoMP notification signal is received), and sets the transmission power using the TPC command of non-application of ULCoMP output from the TPC command reception processing section 1086 in non-application of ULCoMP (Aspect 5).

Figure 12:
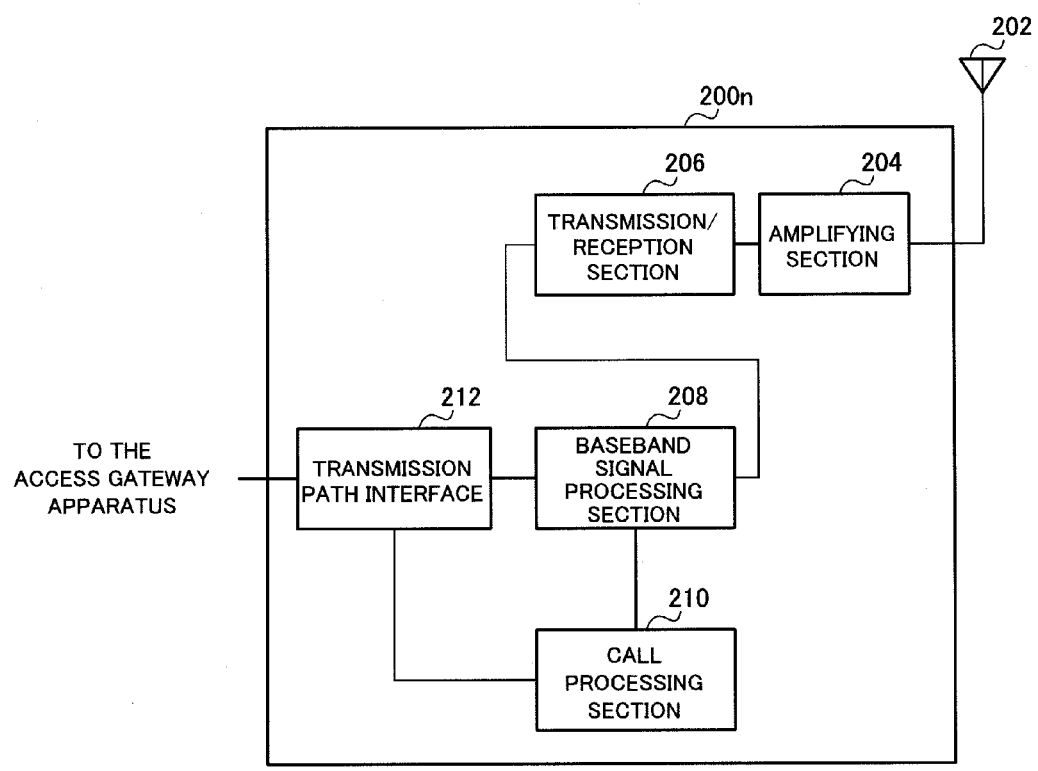
FIG. 12 is a block diagram illustrating a schematic configuration of a radio base station apparatus according to the Embodiment of the invention.

FIG. 12 is a block diagram illustrating a schematic configuration of the radio base station apparatus according to the Embodiment of the invention.

The radio base station apparatus $200_n$ as shown in FIG. 12 is mainly comprised of an antenna 202, amplifying section 204, transmission/reception section 206, baseband signal processing section 208, call processing section 210 and transmission path interface 212.

In the base station apparatus $200_n$ with such a configuration, with respect to uplink data, a radio frequency signal received in the antenna 202 is amplified in the amplifying section 204 so that the reception power is corrected to certain power under AGC. The amplified radio frequency signal is frequency-converted into a baseband signal in the transmission/reception section 206. The baseband signal is subjected to predetermined processing (error correction, decoding, etc.) in the baseband signal processing section 208, and then, is transferred to an access gateway apparatus, not shown, via the transmission path interface 212. The access gateway apparatus is connected to the core network, and manages each mobile terminal. Further, with respect to uplink, reception SINR and interference level of the radio frequency signal received in the base station apparatus 200 are measured based on the uplink baseband signal.

The call processing section 210 transmits and receives call processing control signals to/from a radio control station that is a higher apparatus, and performs status management of the base station apparatus 200 and resource allocation. In addition, the processing in a layer 1 processing section 2081 and MAC processing section 2082 is based on the communication state between the base station apparatus 200 and the mobile station apparatus 100 set by the call processing section 210.

Downlink data is input to the baseband signal processing section 208 from the higher apparatus via the transmission path interface 212. The baseband signal processing section 208 performs processing of retransmission control, scheduling, transmission format selection, channel coding and the like on the data to transfer to the transmission/reception section 206. The transmission/reception section 206 frequency-converts the baseband signal output from the baseband signal processing section 208 into a radio frequency signal. Then, the frequency-converted signal is amplified in the amplifying section 204, and transmitted from the antenna 202.

Figure 13:
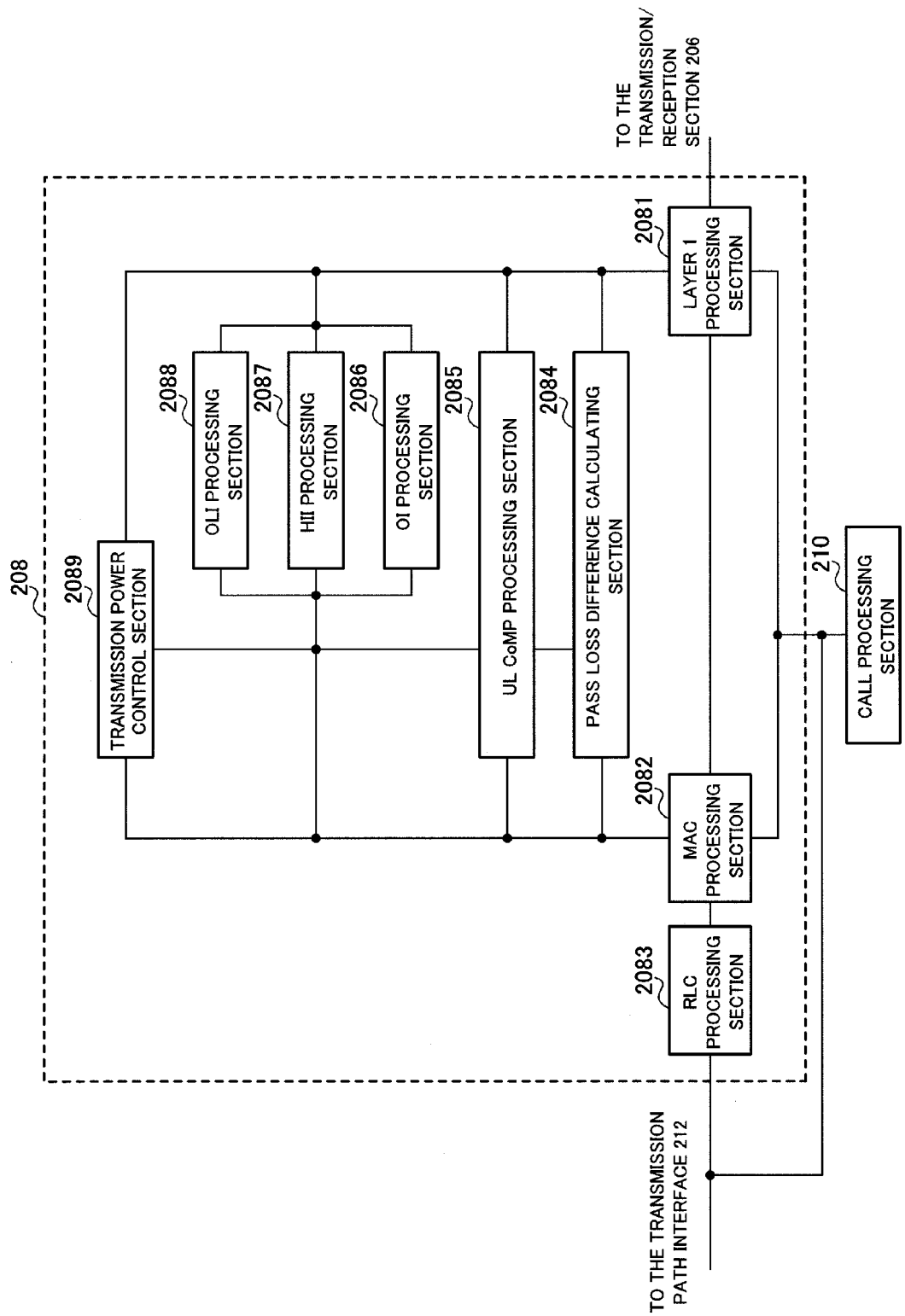
FIG. 13 is a block diagram illustrating a configuration of a baseband signal processing section in the radio base station apparatus as shown in FIG. 12.

FIG. 13 is a block diagram illustrating a configuration of the baseband signal processing section in the radio base station apparatus as shown in FIG. 12.

The baseband signal processing section 208 is mainly comprised of the layer 1 processing section 2081, MAC processing section 2082, RLC processing section 2083, pass loss difference calculating section 2084, ULCoMP processing section 2085, OI processing section 2086, HII processing section 2087, OLI processing section 2088, and transmission power control section 2089.

The layer 1 processing section 2081 performs mainly the processing concerning the physical layer. For example, the layer 1 processing section 2081 performs, on a signal received in uplink, processing such as channel decoding, Discrete Fourier Transform (DFT), frequency demapping, Inverse Fast Fourier Transform (IFFT), and data demodulation. Further, the layer 1 processing section 2081 performs, on a signal to transmit in downlink, processing such as channel coding, data modulation, frequency mapping, and Inverse Fast Fourier Transform (IFFT).

The MAC processing section 2082 performs the processing such as retransmission control in the MAC layer for the signal received in uplink, scheduling for uplink/downlink, selection of the transmission format of the PUSCH/PDSCH, and selection of resource blocks of the PUSCH/PDSCH.

The RLC processing section 2083 performs segmentation of packets, concatenation of packets, retransmission control in the RLC layer and the like on packets received in uplink and packets to transmit in downlink.

The pass loss difference calculating section 2084 calculates a pass loss difference between the mobile terminal and base station apparatuses (candidates for the base station apparatus of the ULCoMP coordinated cell) of adjacent cells of the mobile terminal. In other words, the section 2084 calculates the pass loss between the connected mobile terminal and each of a plurality of base station apparatuses of adjacent cells of the mobile terminal, and extracts the lowest pass loss among the pass losses. The pass loss difference calculating section 2084 outputs the information of the lowest pass loss to the ULCoMP processing section 2085. At this point, the pass loss difference calculating section 2084 also outputs the information of the base station apparatus (base station apparatus of the ULCoMP coordinated cell) with the lowest pass loss to the ULCoMP processing section 2085.

The ULCoMP processing section 2085 determines whether or not to apply ULCoMP to the mobile terminal based on the calculation result of the pass loss difference calculating section 2084. When a difference ($PL_2-PL_1$) between a pass loss $PL_1$ between the base station apparatus and the mobile terminal and a pass loss $PL_2$ between the mobile terminal and the base station apparatus with the lowest pass loss for the mobile terminal is within a predetermined range, the ULCoMP processing section 2085 determines ULCoMP application to the mobile terminal. When the difference ($PL_2-PL_1$) is not within the predetermined range, the ULCoMP processing section 2085 determines ULCoMP non-application to the mobile terminal. The ULCoMP processing section 2085 outputs a determination result of application/non-application of ULCoMP to the OI processing section 2086, HII processing section 2087 or OLI processing section 2088, while outputting the result to the transmission power control section 2089.

Further, the ULCoMP processing section 2085 notifies the mobile terminal of the information of ULCoMP application/non-application. The information is notified to the ULCoMP applied mobile terminal via the PBCH, PDSCH or PDCCH.

In the case where the base station apparatus is the base station apparatus of the ULCoMP coordinated cell, when the number of mobile terminals to apply ULCoMP is changed and a change occurs in the content of ULOI, the OI processing section 2086 generates ULOI and notifies the base station apparatus of the connected cell of the ULOI (Aspect 6). In application of ULCoMP, when a change occurs in the content of ULOI, the OI processing section 2086 generates OI of ULOI restrictions reset, and notifies the base station apparatus of the connected cell of the OI via X2 interface. Further, in non-application of ULCoMP, when necessary, the OI processing section 2086 generates OI of ULOI restrictions, and notifies the base station apparatus of the connected cell of the OI via X2 interface. In this case, the base station apparatus of the ULCoMP coordinated cell is notified of information on ULCoMP application/non-application from the base station apparatus of the connected cell by X2 interface.

The HII processing section 2087 generates ULHII, and notifies the base station apparatus of the ULCoMP coordinated cell of the ULHII. In application of ULCoMP (when the determination result of ULCoMP application is received from the ULCoMP processing section 2085) i.e. when the number of mobile terminals to apply ULCoMP is changed and a change occurs in the content of HII, the HII processing section 2087 generates HII of HII restrictions reset, and notifies the base station apparatus of the ULCoMP coordinated cell of the HII via X2 interface (Aspect 6). Meanwhile, in non-application of ULCoMP (when the determination result of ULCoMP non-application is received from the ULCoMP processing section 2085), when necessary, the HII processing section 2087 generates HII of HII restrictions, and notifies the base station apparatus of the ULCoMP coordinated cell of the HII via X2 interface.

The OLI processing section 2088 generates OLI, and notifies the mobile terminal communicating with the base station of the connected cell (adjacent cell) of the OLI (Aspect 7). When the base station apparatus is the base station apparatus of the ULCoMP coordinated cell, the OLI processing section 2088 generates OLI of OLI restrictions reset, and directly notifies the mobile terminal communicating with the base station apparatus of the connected cell of the OLI. Meanwhile, in non-application of ULCoMP, when necessary, the OLI processing section 2088 generates OLI of OLI restrictions, and notifies the mobile terminal communicating with the base station apparatus of the connected cell of the OLI via X2 interface. In this case, the base station apparatus of the ULCoMP coordinated cell is notified of information on ULCoMP application/non-application from the base station apparatus of the connected cell by X2 interface.

The transmission power control section 2089 performs transmission power control of ULCoMP application in application of ULCoMP, while performing transmission power control of ULCoMP non-application in non-application of ULCoMP.

Figure 14:
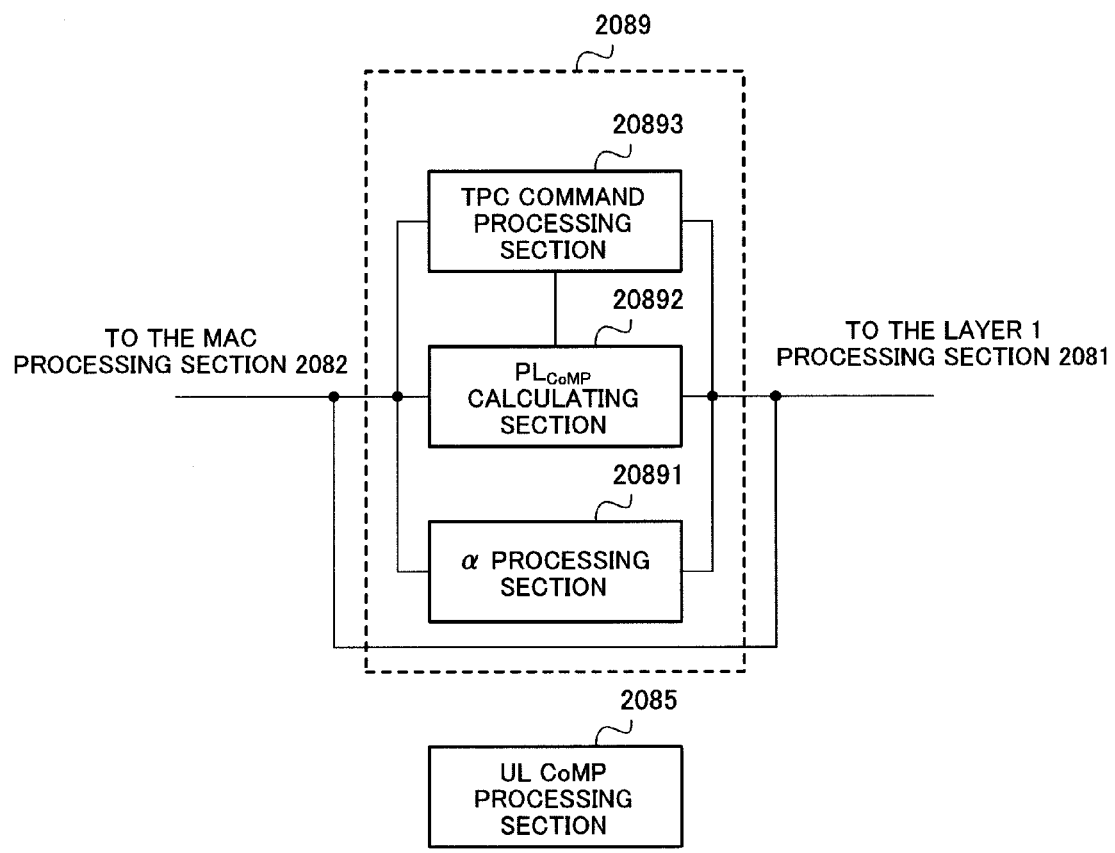
FIG. 14 is a block diagram illustrating a configuration of a transmission power control section in the baseband signal processing section as shown in FIG. 13.

FIG. 14 is a block diagram illustrating a configuration of the transmission power control section in the baseband signal processing section as shown in FIG. 13.

The transmission power control section 2089 is mainly comprised of an α processing section 20891, $PL_{CoMP}$ calculating section 20892, and TPC command processing section 20893.

The α processing section 20891 generates an attenuation coefficient α used in transmission power control. The section 20891 generates an attenuation coefficient $\alpha_1$ for ULCoMP application and an attenuation coefficient $\alpha_2$ for ULCoMP non-application. The attenuation coefficients $\alpha_1$ and $\alpha_2$ are notified to the ULCoMP applied mobile terminal via the PDSCH and PDCCH, or are broadcast via the PBCH (Aspect 1).

The $PL_{CoMP}$ calculating section 20892 calculates a pass loss value used in closed-loop transmission power control. In application of ULCoMP (when the determination of result of ULCoMP application is received), the $PL_{CoMP}$ calculating section 20892 calculates $PL_{CoMP}$, using a pass loss $PL_1$ between the base station apparatus (base station apparatus of the connected cell) and the mobile terminal and a pass loss $PL_2$ between the mobile terminal and the base station apparatus of the ULCoMP coordinated cell (Aspect 2). In this case, the pass loss $PL_1$ is a pass loss acquired from the mobile terminal, and is output to the $PL_{CoMP}$ calculating section 20892, and the pass loss $PL_2$ is acquired from the mobile terminal or the base station apparatus of the ULCoMP coordinated cell via X2 interface, and is output to the $PL_{CoMP}$ calculating section 20892. In non-application of ULCoMP, the pass loss $PL_1$ and pass loss $PL_2$ are output to the TPC command processing section 20893.

The TPC command processing section 20893 sets the target reception power ($P_{Rx}$) or target reception SINR ($T_{SINR}$)

using the pass loss difference ($PL_{Diff}$), reception power reference value (Px), pass loss difference correction coefficient ($\beta$), offset ($\gamma$) and target reception SINR reference value ($T_X$), and generates a TPC command from a difference between the measured reception power and the target reception power, or a difference between the measured reception SINR and target reception SINR.

In application of ULCoMP (when the determination result of ULCoMP application is received), as a pass loss difference ($PL_{Diff}$), the TPC command processing section 20893 uses a pass loss difference obtained using a pass loss $PL_{CoMP}$ obtained from the pass loss $PL_1$ and the pass loss $PL_2$ between the base station apparatus of the ULCoMP coordinated cell and the mobile terminal (Aspect 3). For example, in application of ULCoMP, the section sets that $PL_{Diff}=PL_3-PL_{CoMP}$ as the propagation difference ($PL_{Diff}$). Herein, the pass loss $PL_3$ represents a pass loss between the base station apparatus of the adjacent cell with the lowest pass loss except the ULCoMP coordinated cell and the mobile terminal. In addition, the pass loss $PL_1$ is acquired from the mobile terminal, and $PL_2$ and $PL_3$ are acquired from the mobile terminal or the adjacent base station apparatus via X2 interface.

The TPC command processing section 20893 makes a transmission power control amount of ULCoMP application larger than a transmission power control amount of ULCoMP non-application (Aspect 4). The TPC command processing section 20893 generates a TPC command of a higher number of bits and a larger range than in the TPC command of non-application of ULCoMP in application of ULCoMP (when the determination result of ULCoMP application is received), and generates the TPC command of non-application of ULCoMP in non-application of ULCoMP. Thus generated TPC command is transmitted to the mobile terminal via the PDCCH.

In the radio communication system with the above-mentioned configuration, the base station apparatus 200₁ connected to the mobile terminal 100₁ applies ULCoMP to the mobile terminal 100₁ when a difference ($PL_2-PL_1$) between the pass loss $PL_1$ between the mobile terminal 100₁ and the base station apparatus 200₁ and the pass loss $PL_2$ between the mobile terminal 100₁ and a base station apparatus 200₂ with the lowest pass loss for the mobile terminal 100₁ is within a predetermined range, and transmits a transmission power control parameter of application of ULCoMP to the mobile terminal 100₁ in application of ULCoMP, while transmitting a transmission power control parameter of non-application of ULCoMP to the mobile terminal 100₁ in non-application of ULCoMP, and the mobile terminal 100₁ receives the transmission power control parameter transmitted from the base station apparatus 200₁, and sets the transmission power using the transmission power control parameter different from the transmission power control parameter of non-application of ULCoMP in application of ULCoMP.

According to such a transmission power control method, since transmission power control for application of ULCoMP is adopted in application of ULCoMP, it is possible to use the conventional inter-cell interference reduction techniques and ULCoMP together without reducing gain of ULCoMP.

In addition, in the above-mentioned configurations of the radio base station apparatus and mobile terminal apparatus, in relation to the description, the figures are shown to be able to support all the aspects. Accordingly, blocks that are not used in each aspect may be not provided in the apparatuses according to the aspect.

Described next is a processing procedure of each aspect in the transmission power control method of the invention.

Figure 15:
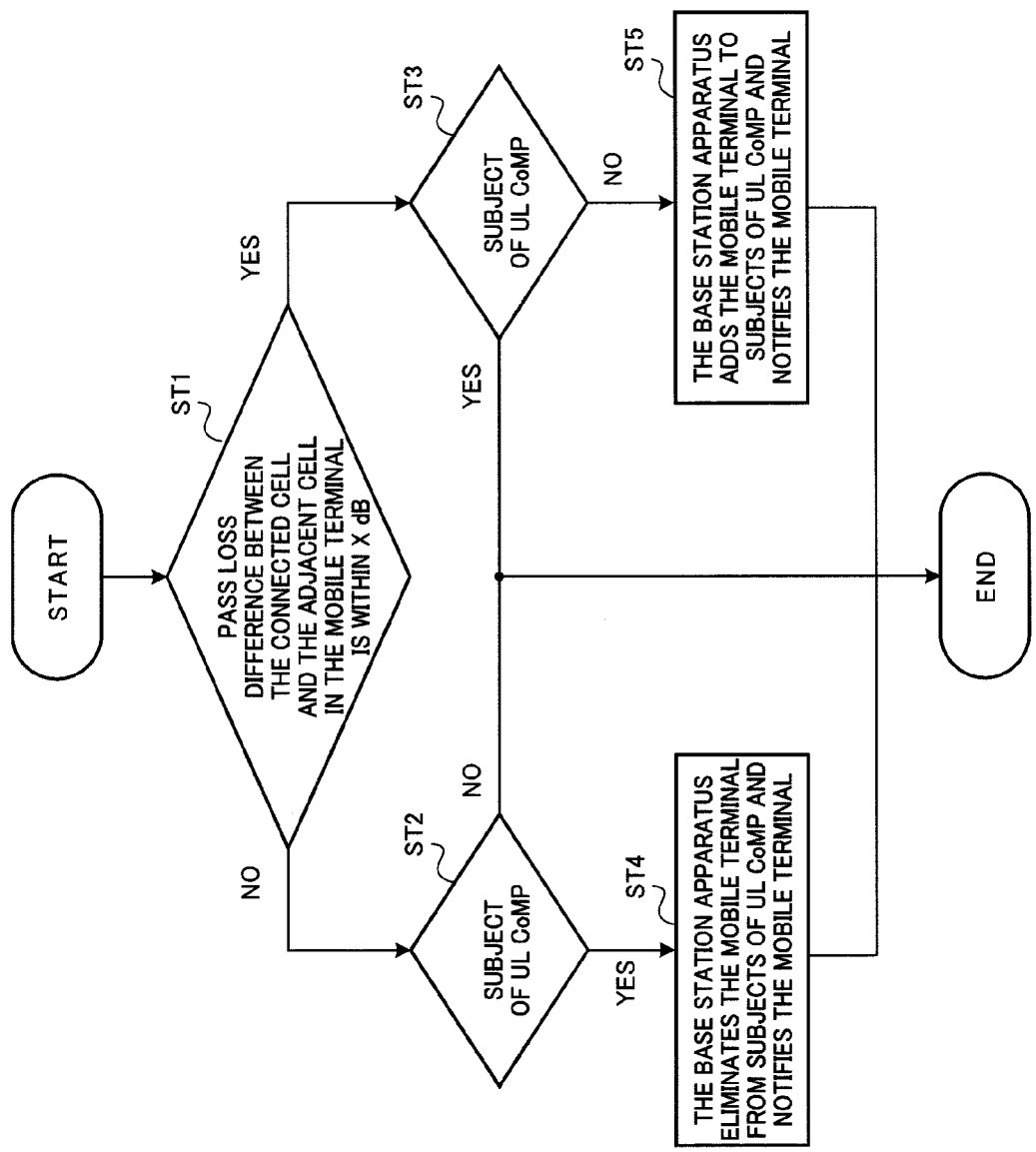
FIG. 15 is a flow diagram illustrating a procedure concerning notification of ULCoMP application/non-application of the transmission power control method according to the invention.

FIG. 15 is a flow diagram showing an example of a procedure concerning notification of ULCoMP application/non-application of the transmission power control method according to the invention.

First, the ULCoMP processing section 2085 of the base station apparatus determines whether a difference between a pass loss between the mobile terminal and the base station apparatus of the connected cell and a pass loss between the mobile terminal and a base station apparatus of the adjacent cell is within a predetermined range (within X dB) (ST1).

In the case where the pass loss difference is not within X dB, when the mobile terminal is already a subject of ULCoMP (ST2), the ULCoMP processing section 2085 of the base station apparatus eliminates the mobile terminal from subjects of ULCoMP and notifies the mobile terminal of the elimination (ST4). Meanwhile, in the case where the pass loss difference is within X dB, when the mobile terminal is not a subject of ULCoMP yet (ST3), the ULCoMP processing section 2085 of the base station apparatus adds the mobile terminal to subjects of ULCoMP and notifies the mobile terminal of the addition (ST5). Higher Layer signaling such as the PDSCH is used for such notification to the mobile terminal.

Figure 16:
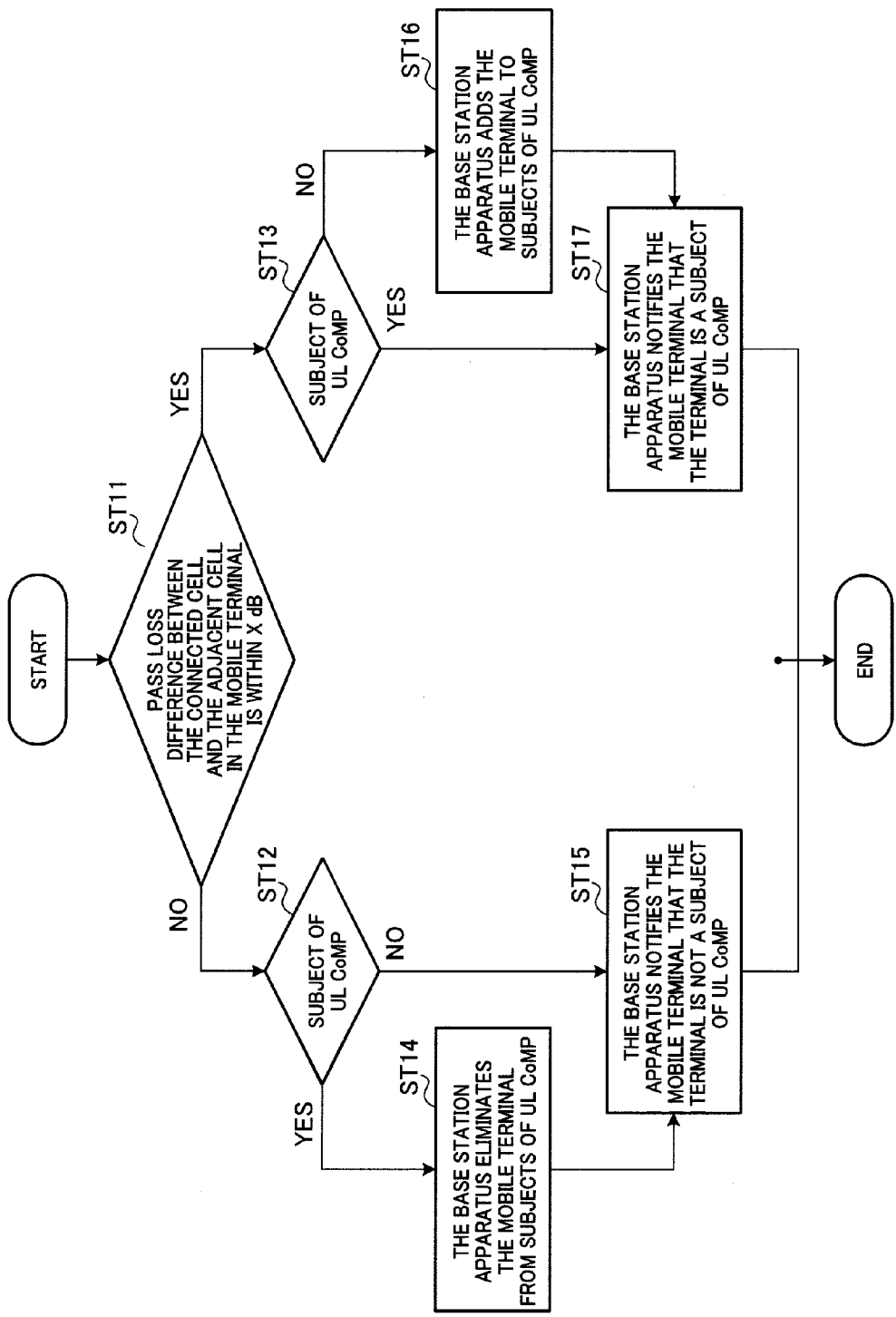
FIG. 16 is a flow diagram showing another example of the procedure concerning notification of ULCoMP application/non-application of the transmission power control method according to the invention.

FIG. 16 is a flow diagram showing another example of the procedure concerning notification of ULCoMP application/non-application of the transmission power control method according to the invention.

First, the ULCoMP processing section 2085 of the base station apparatus determines whether a difference between a pass loss between the mobile terminal and the base station apparatus of the connected cell and a pass loss between the mobile terminal and a base station apparatus of the adjacent cell is within a predetermined range (within X dB) (ST11).

In the case where the pass loss difference is not within X dB, when the mobile terminal is already a subject of ULCoMP (ST12), the ULCoMP processing section 2085 of the base station apparatus eliminates the mobile terminal from subjects of ULCoMP (ST14), and notifies the mobile terminal that the terminal is not a subject of ULCoMP (ST15). Meanwhile, in the case where the pass loss difference is within X dB, when the mobile terminal is not a subject of ULCoMP yet (ST13), the ULCoMP processing section 2085 of the base station apparatus adds the mobile terminal to subjects of ULCoMP (ST16), and notifies the mobile terminal that the terminal is a subject of ULCoMP (ST17). L1/L2 signaling such as the PDCCH is used for such notification to the mobile terminal.

Figure 17:
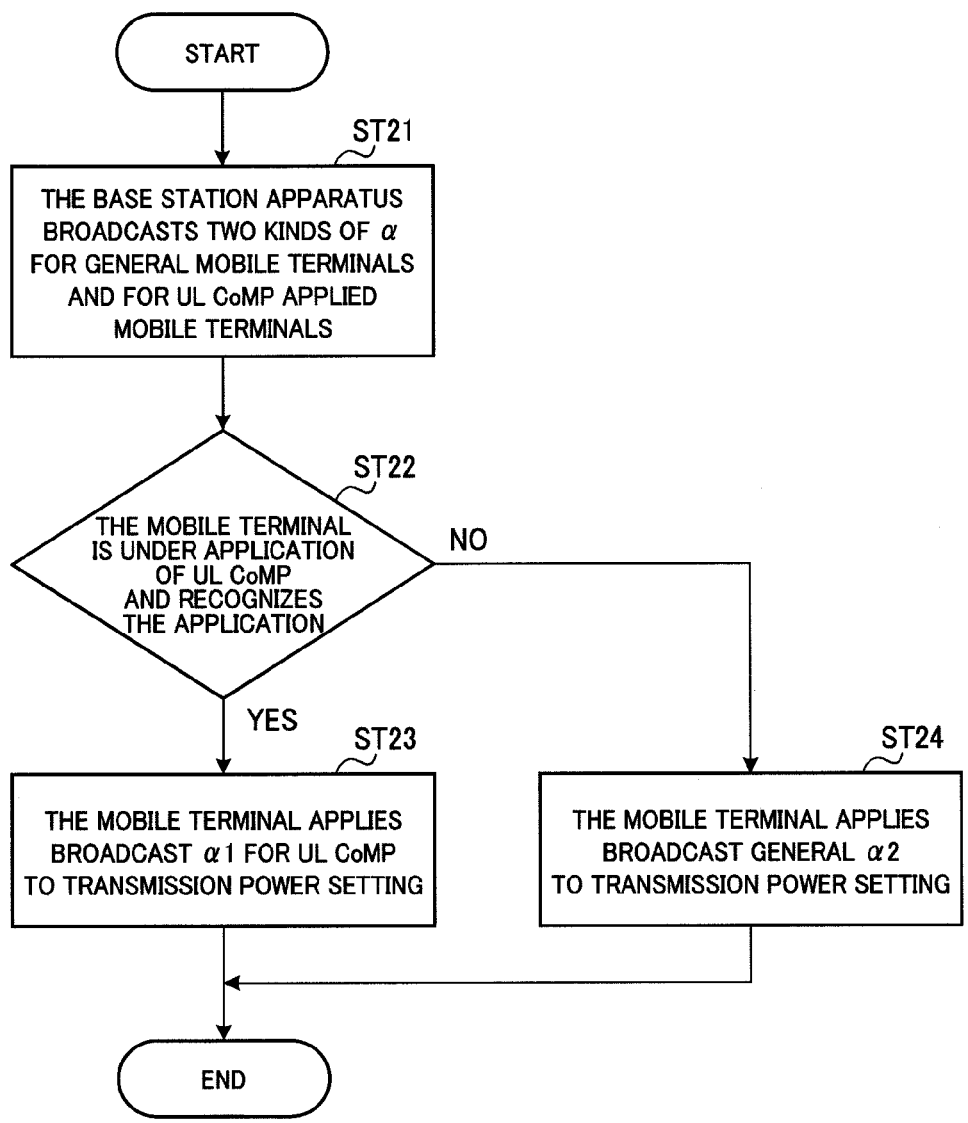
FIG. 17 is a flow diagram showing an example of a procedure of the aspect 1 of the transmission power control method according to the invention.

FIG. 17 is a flow diagram showing an example of a procedure of the aspect 1 of the transmission power control method according to the invention.

The $\alpha$ processing section 20891 of the base station apparatus generates an attenuation coefficient $\alpha_2$ for general mobile terminals (mobile terminals of ULCoMP non-application) and an attenuation coefficient $\alpha_1$ for ULCoMP applied mobile terminals, and broadcasts two kinds of attenuation coefficients via the PBCH (ST21).

The mobile terminal determines whether ULCoMP is applied to the mobile terminal and whether the mobile terminal recognizes the application (ST22), and when the mobile terminal recognizes that ULCoMP is applied to the mobile terminal, the transmission power setting section 1089 sets the transmission power based on above-mentioned equation (1) using the attenuation coefficient $\alpha_1$ for ULCoMP applied mobile terminals (ST23). Meanwhile, when ULCoMP is not applied to the mobile terminal, the transmission power setting section 1089 sets the transmission power based on above-mentioned equation (1) using the attenuation coefficient $\alpha_2$ for general mobile terminals (ST24).

Figure 18:
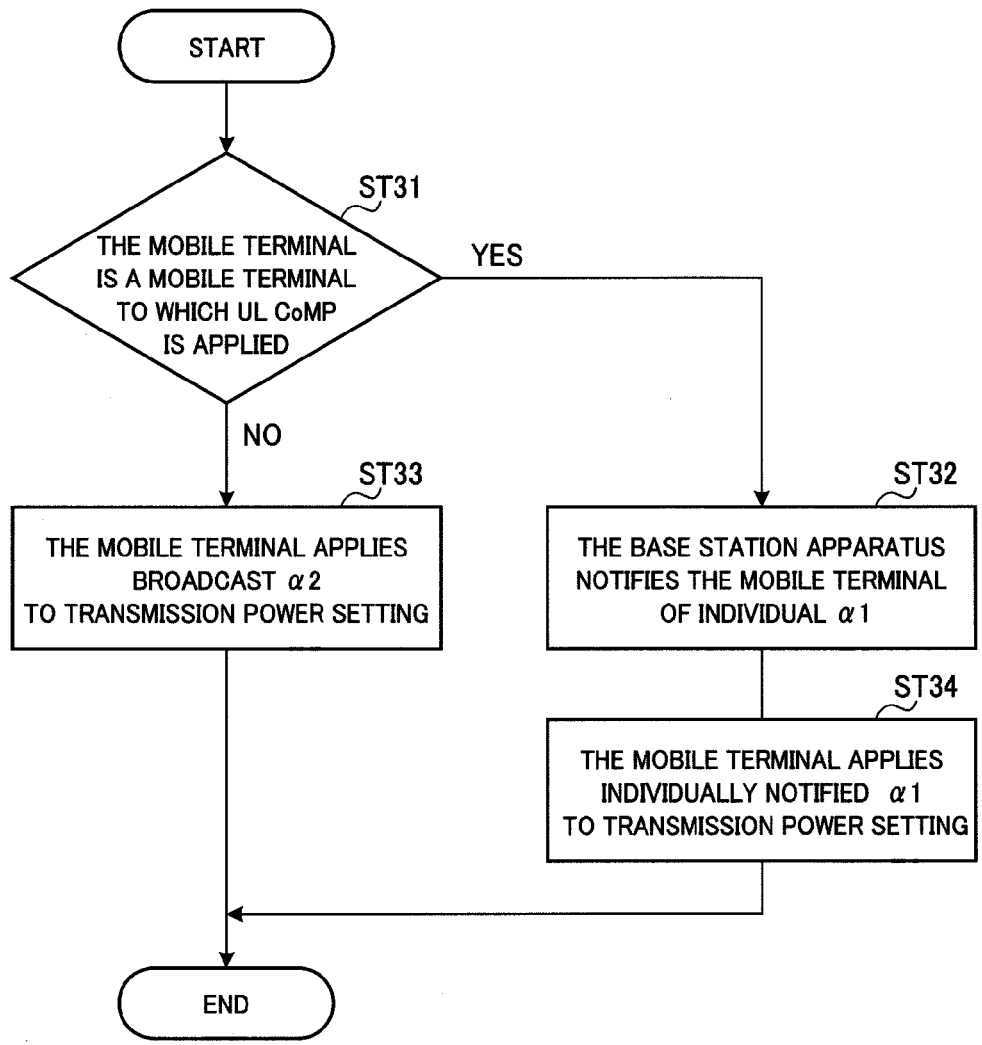
FIG. 18 is a flow diagram showing another example of the procedure of the aspect 1 of the transmission power control method according to the invention.

FIG. 18 is a flow diagram showing another example of the procedure of the aspect 1 of the transmission power control method according to the invention.

It is determined whether the mobile terminal is a ULCoMP applied mobile terminal (ST31), and when the mobile terminal is not a ULCoMP applied mobile terminal, the transmission power setting section 1089 sets the transmission power based on above-mentioned equation (1) using the broadcast attenuation coefficient $\alpha_2$ for general mobile terminals (ST33). Meanwhile, when the mobile terminal is a mobile terminal to apply ULCoMP, the base station apparatus notifies the mobile terminal of an individual attenuation coefficient $\alpha_1$ (ST32). Higher Layer signaling such as the PDSCH and L1/L2 signaling such as the PDCCH are used for such notification. Then, in the mobile terminal, the transmission power setting section 1089 sets the transmission power based on above-mentioned equation (1) using the individually notified attenuation coefficient $\alpha_1$ (ST34).

Figure 19:
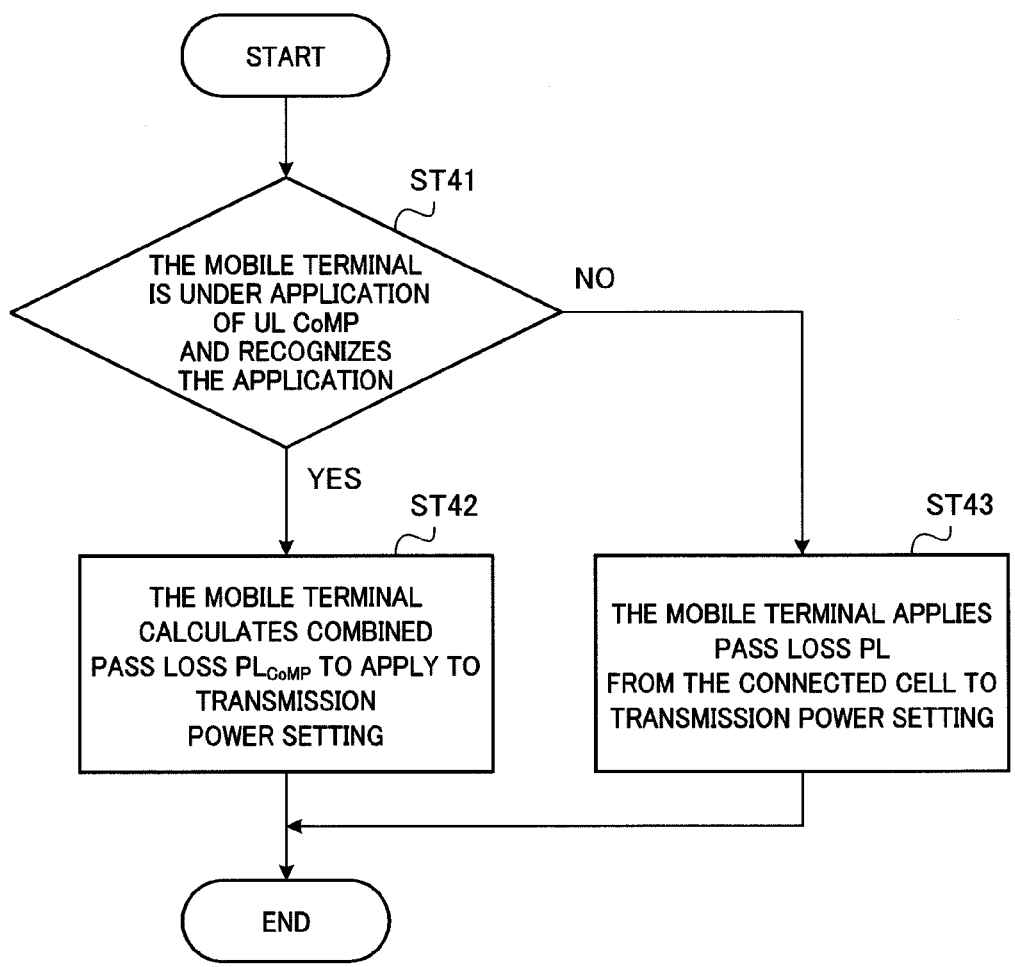
FIG. 19 is a flow diagram illustrating a procedure of the aspect 2 of the transmission power control method according to the invention.

FIG. 19 is a flow diagram illustrating a procedure of the aspect 2 of the transmission power control method according to the invention.

The mobile terminal determines whether ULCoMP is applied to the mobile terminal and whether the mobile terminal recognizes the application (ST41), and when the mobile terminal recognizes that ULCoMP is applied to the mobile terminal, the $PL_{CoMP}$ Calculating section 1088 of the mobile terminal calculates the combined pass loss $PL_{CoMP}$, while the transmission power setting section 1089 sets the transmission power based on above-mentioned equation (1) using the $PL_{CoMP}$ (ST42). Meanwhile, when ULCoMP is not applied to the mobile terminal, the transmission power setting section 1089 sets the transmission power based on above-mentioned equation (1) using the pass loss $PL_1$ between the mobile terminal and the base station apparatus of the connected cell (ST43).

Figure 20:
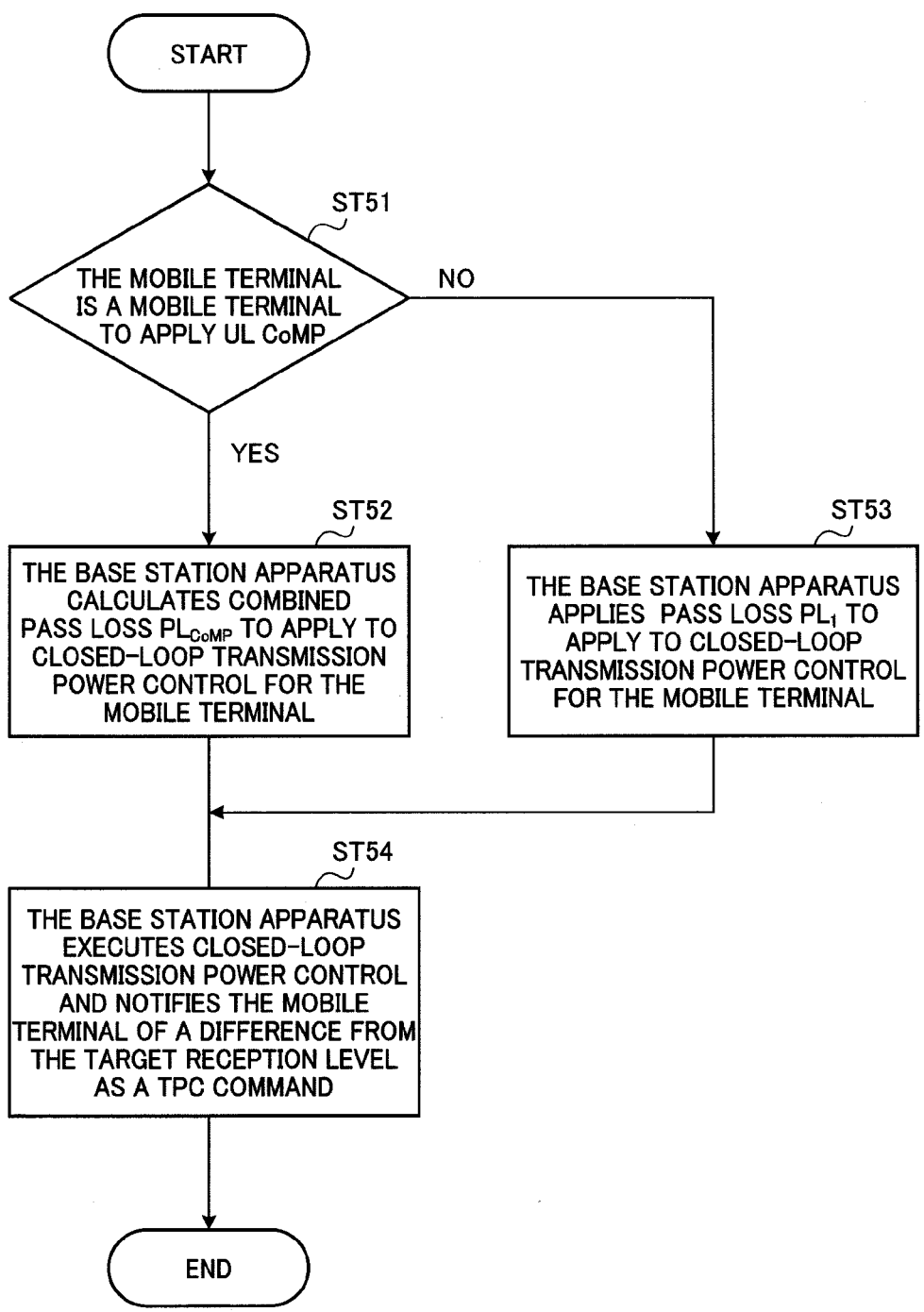
FIG. 20 is a flow diagram illustrating a procedure of the aspect 3 of the transmission power control method according to the invention.

FIG. 20 is a flow diagram illustrating a procedure of the aspect 3 of the transmission power control method according to the invention.

It is determined whether the mobile terminal is a mobile terminal to apply ULCoMP (ST51), and when the mobile terminal is a mobile terminal to apply ULCoMP, in the base station apparatus the $PL_{CoMP}$ Calculating section 20892 calculates the combined pass loss $PL_{CoMP}$ to apply to closed-loop transmission power control of the mobile terminal (ST52). Then, the TPC command processing section 20893 generates a TPC command from a difference between the measured reception level and the target reception level. The transmission power control section 2089 executes closed-loop transmission power control, and transmits the TPC command to the mobile terminal (ST54). Meanwhile, when the mobile terminal is not a mobile terminal to apply ULCoMP, the base station apparatus applies the pass loss $PL_1$ to closed-loop transmission power control of the mobile terminal (ST53). Then, the TPC command processing section 20893 generates a TPC command from a difference between the measured reception level and the target reception level. The transmission power control section 2089 executes closed-loop transmission power control, and transmits the TPC command to the mobile terminal (ST54).

Figure 21:
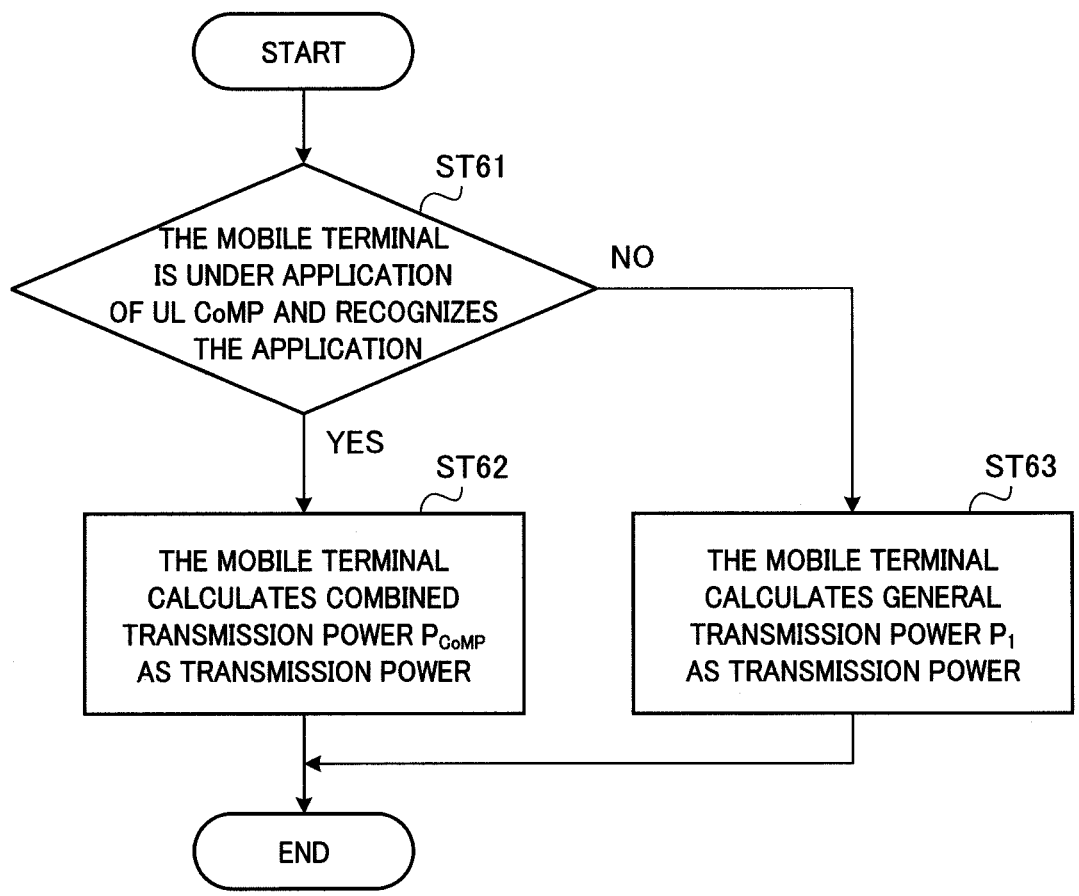
FIG. 21 is a flow diagram illustrating a procedure of the aspect 4 of the transmission power control method according to the invention.

FIG. 21 is a flow diagram illustrating a procedure of the aspect 4 of the transmission power control method according to the invention.

The mobile terminal determines whether ULCoMP is applied to the mobile terminal and whether the mobile terminal recognizes the application (ST61), and when the mobile terminal recognizes that ULCoMP is applied to the mobile terminal, the transmission power setting section 1089 of the mobile terminal calculates the combined transmission power $P_{CoMP}$ to use as the transmission power (ST62). Meanwhile, when ULCoMP is not applied to the mobile terminal, the transmission power setting section 1089 calculates the transmission power $P_1$ by the general method using above-mentioned equation (1) to use as the transmission power (ST63).

Figure 22:
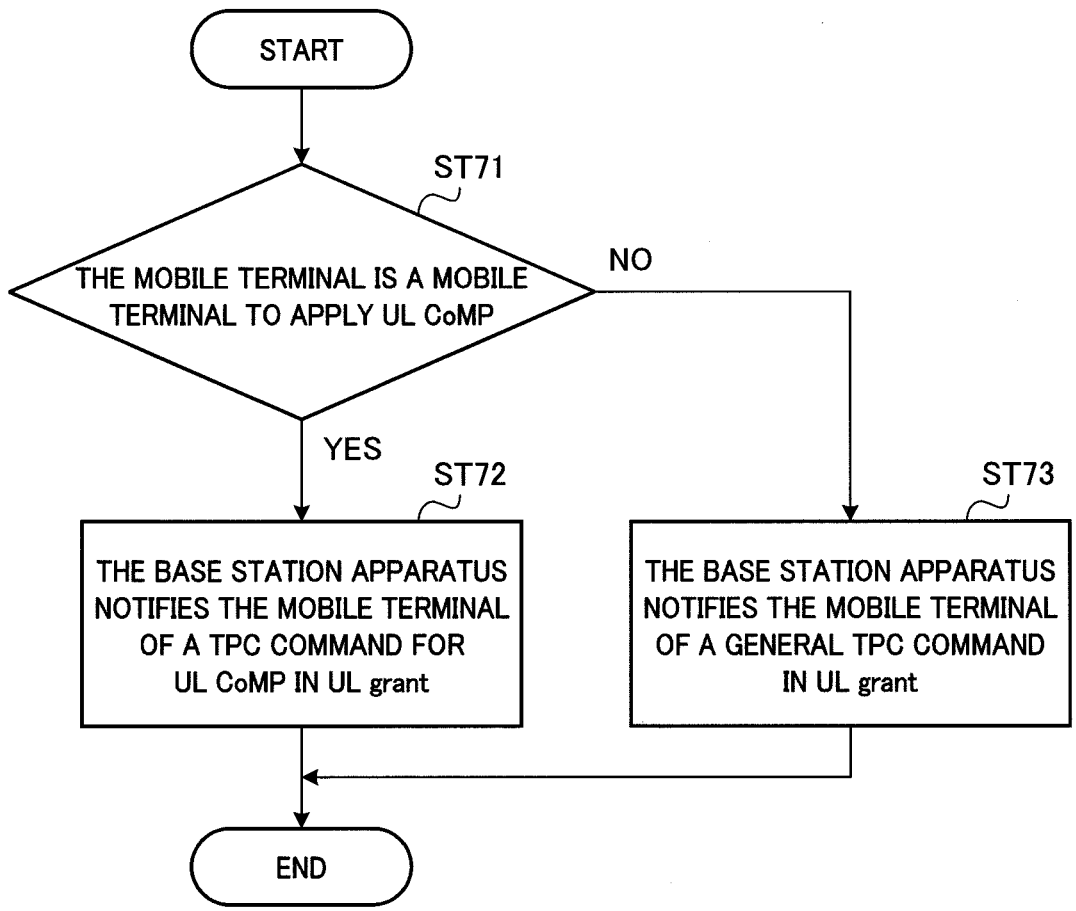
FIG. 22 is a flow diagram illustrating a procedure of the aspect 5 of the transmission power control method according to the invention.

FIG. 22 is a flow diagram illustrating a procedure of the aspect 5 of the transmission power control method according to the invention.

It is determined whether the mobile terminal is a mobile terminal to apply ULCoMP (ST71), and when the mobile terminal is a mobile terminal to apply ULCoMP, the TPC command processing section 20893 of the base station apparatus generates a TPC command for ULCoMP, and notifies the mobile terminal of the TPC command in the UL Grant (ST72). Meanwhile, when the mobile terminal is not a mobile terminal to apply ULCoMP, the TPC command processing section 20893 of the base station apparatus generates a general TPC command, and notifies the mobile terminal of the TPC command in the UL Grant (ST73).

Figure 23:
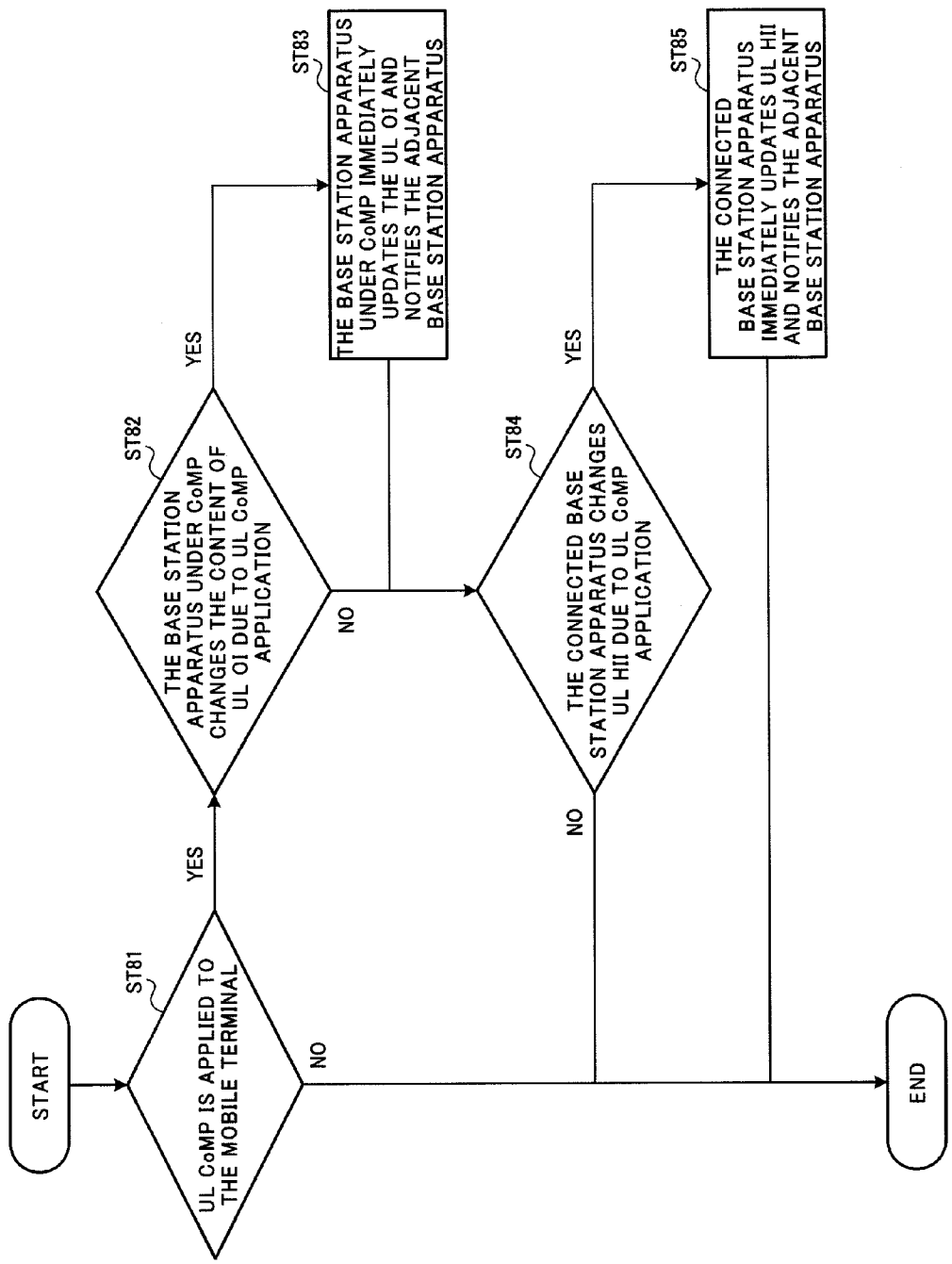
FIG. 23 is a flow diagram illustrating a procedure of the aspect 6 of the transmission power control method according to the invention.

FIG. 23 is a flow diagram illustrating a procedure of the aspect 6 of the transmission power control method according to the invention.

It is determined whether the mobile terminal is a mobile terminal to apply ULCoMP (ST81), and when the mobile terminal is a mobile terminal to apply ULCoMP, the OI processing section 2086 of the base station apparatus of the ULCoMP coordinated cell determines whether to change the content of ULOI (to reset ULOI restrictions) (ST82). When the content of ULOI is changed, the base station apparatus of the ULCoMP coordinated cell immediately updates the ULOI and notifies the base station apparatus of the connected cell (ST83). Meanwhile, when the content of ULOI is not changed, the HII processing section 2087 of the base station apparatus of the connected cell determines whether to change the content of ULHII (to reset restrictions of ULHII) (ST84). When the content of ULHII is changed, the base station apparatus of the connected cell immediately updates the ULHII and notifies the base station apparatus of the ULCoMP coordinated cell (ST85).

Figure 24:
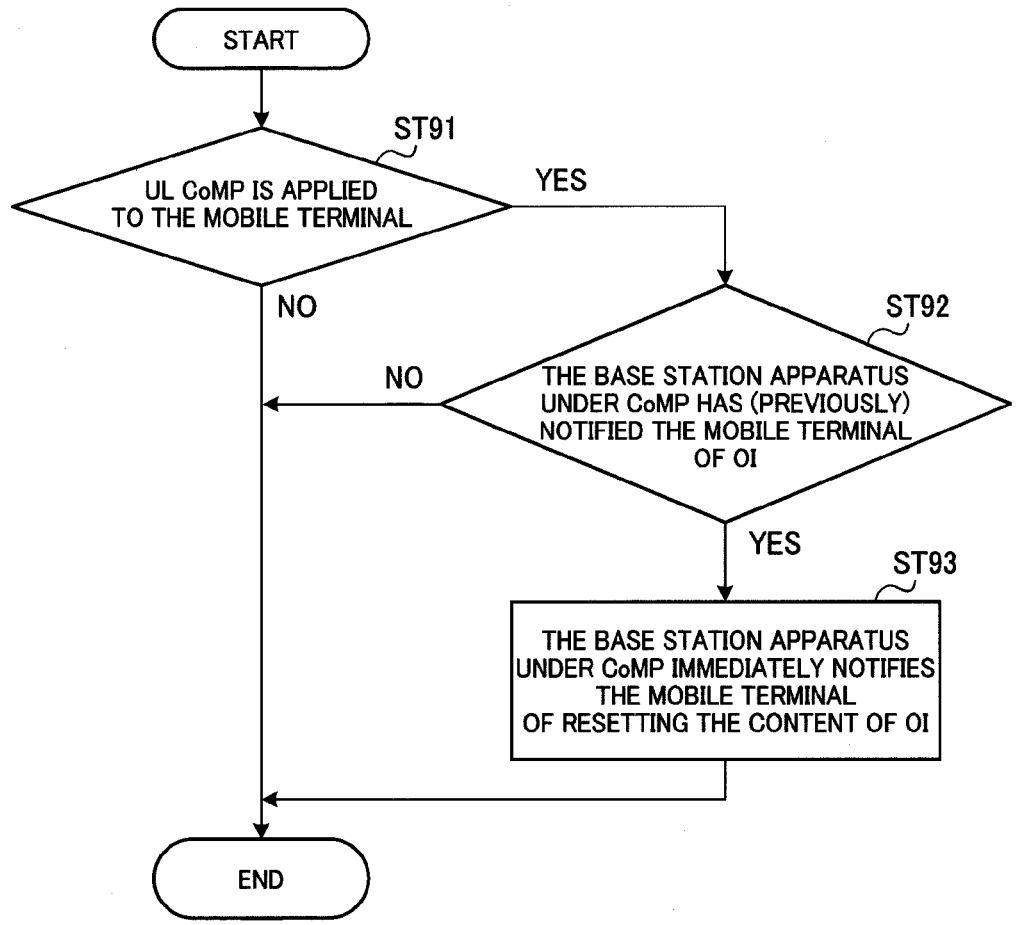
FIG. 24 is a flow diagram illustrating a procedure of the aspect 7 of the transmission power control method according to the invention.

FIG. 24 is a flow diagram illustrating a procedure of the aspect 7 of the transmission power control method according to the invention.

It is determined whether the mobile terminal is a mobile terminal to apply ULCoMP (ST91), and when the mobile terminal is a mobile terminal to apply ULCoMP, the OLI processing section 2088 of the base station apparatus of the ULCoMP coordinated cell determines whether the mobile terminal is (previously) notified of OLI (ST92). When the mobile terminal is (previously) notified of OLI, the OLI processing section 2088 of the base station apparatus of the ULCoMP coordinated cell immediately notifies the mobile terminal of resetting the content of the OLI (ST93).

The Embodiment disclosed this time is illustrative in all the respects, and the invention is not limited to the Embodiment. The scope of the invention is indicated by the scope of the claims rather than by the description of only the above-mentioned Embodiment, and is intended to include senses equal to the scope of the claims and all modifications within the scope of the claims.

INDUSTRIAL APPLICABILITY

The present invention is effective in the LTE-A system radio base station apparatus, mobile terminal apparatus and transmission power control method.

The present application is based on Japanese Patent Application No. 2009-148998 filed on Jun. 23, 2009, entire content of which is expressly incorporated by reference herein.

The invention claimed is:

1. A radio base station apparatus comprising a processor and a memory, the processor comprising:
a multiple point reception processing section configured to apply uplink coordinated multiple point reception to a mobile terminal apparatus when a difference ($PL_2$-$PL_1$) between a first pass loss $PL_1$ between the mobile terminal apparatus and a first radio base station apparatus connected to the mobile terminal apparatus and a second pass loss $PL_2$ between the mobile terminal apparatus and a second radio base station apparatus with the lowest pass loss for the mobile terminal apparatus is within a predetermined range; and
a transmission power control section configured to perform transmission power control for application of uplink coordinated multiple point reception when the uplink coordinated multiple point reception is applied, while performing transmission power control for non-application of the uplink coordinated multiple point reception when the uplink coordinated multiple point reception is not applied,
wherein the radio base station apparatus performs fractional transmission power control, the transmission power control section generates an attenuation coefficient for application of uplink coordinated multiple point reception, and an attenuation coefficient for non-application of uplink coordinated multiple point reception, and the transmission power control section uses a pass loss difference obtained using a pass loss calculated from the first pass loss and a pass loss between the second radio base station apparatus and the mobile terminal apparatus, as a substitute for the first pass loss, as a pass loss for application of uplink coordinated multiple point reception.

2. The radio base station apparatus according to claim 1, wherein the transmission power control section makes a transmission power control amount for application of uplink coordinated multiple point reception larger than a transmission power control amount for non-application of the uplink coordinated multiple point reception.

3. The radio base station apparatus according to claim 1, wherein the radio base station apparatus is a radio base station apparatus that performs control using UL Overload Indication, and has an Overload Indication (OI) processing section that changes the content of UL Overload Indication when a change occurs in the number of mobile terminal apparatuses to apply the uplink coordinated multiple point reception.

4. The radio base station apparatus according to claim 1, wherein the radio base station apparatus is a radio base station apparatus that performs control using UL High Interference Indication, and has a High Interference Indication (HII) processing section that changes the content of UL High Interference Indication when a change occurs in the number of mobile terminal apparatuses to apply the uplink coordinated multiple point reception.

5. The radio base station apparatus according to claim 1, wherein the radio base station apparatus performs control using Overload Indicator, and notifies a mobile terminal apparatus to apply the uplink coordinated multiple point reception of resetting the content of Overload Indicator.

6. The radio base station apparatus according to claim 1, wherein the radio base station apparatus transmits a notification signal of application/non-application of uplink coordinated multiple point reception to a mobile terminal apparatus to apply uplink coordinated multiple point reception.

* * * * *

UNITED STATES PATENT AND TRADEMARK OFFICE
CERTIFICATE OF CORRECTION

PATENT NO. : 8,958,355 B2
APPLICATION NO. : 13/378682
DATED : February 17, 2015
INVENTOR(S) : Daisuke Nishikawa et al.

Page 1 of 5

It is certified that error appears in the above-identified patent and that said Letters Patent is hereby corrected as shown below:

On the title page, in the Abstract (57):
"between a pass loss $PL_1$ between the mobile terminal [...] and a pass loss $PL_2$ between the mobile terminal [...] with the lowest pass loss for the mobile terminal" should read between a path loss $PL_1$ between the mobile terminal [...] and a path loss $PL_2$ between the mobile terminal [...] with the lowest path loss for the mobile terminal

On the title page, in the illustrative figure, Reference Numeral ST1, "pass loss difference between the connected cell and the adjacent cell in the mobile terminal" should read path loss difference between the connected cell and the adjacent cell in the mobile terminal

On the title page, in the illustrative figure, Reference Numeral ST11, "pass loss difference between the connected cell and the adjacent cell in the mobile terminal" should read path loss difference between the connected cell and the adjacent cell in the mobile terminal

In the Drawings:

At Sheet 3 of 22, Fig. 5, "pass loss difference" should read path loss difference

At Sheet 9 of 22, Fig. 13, "pass loss difference calculating section" should read path loss difference calculating section

At Sheet 11 of 22, Fig. 15, "pass loss difference between the connected cell and the adjacent cell in the mobile terminal" should read path loss difference between the connected cell and the adjacent cell in the mobile terminal

Signed and Sealed this
Seventh Day of July, 2015

Michelle K. Lee
*Director of the United States Patent and Trademark Office*

At Sheet 12 of 22, Fig. 16, "pass loss difference between the connected cell and the adjacent cell in the mobile terminal" should read path loss difference between the connected cell and the adjacent cell in the mobile terminal

At Sheet 15 of 22, Fig. 19, "the mobile terminal calculates combined pass loss" should read the mobile terminal calculates combined path loss and, "the mobile terminal applies pass loss" should read the mobile terminal applies path loss

At Sheet 16 of 22, Fig. 20, "the base station apparatus calculates combined pass loss" should read the base station apparatus calculates combined path loss and, "the base station apparatus applies pass loss" should read the base station apparatus applies path loss

Figure 25:
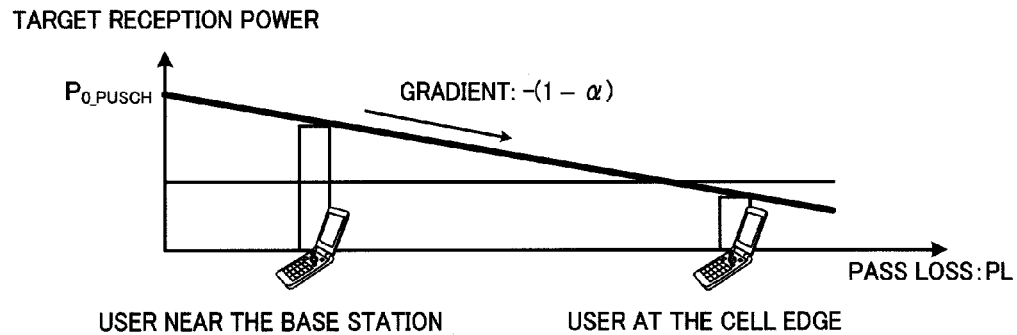
FIG. 25 is a diagram to explain fractional transmission power control.
Figure 26:
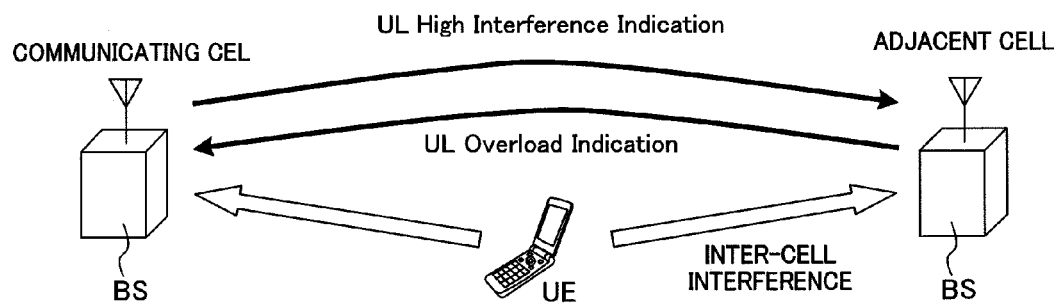
FIG. 26 is a diagram to explain signalings of ULOI and ULHII.
Figure 27:
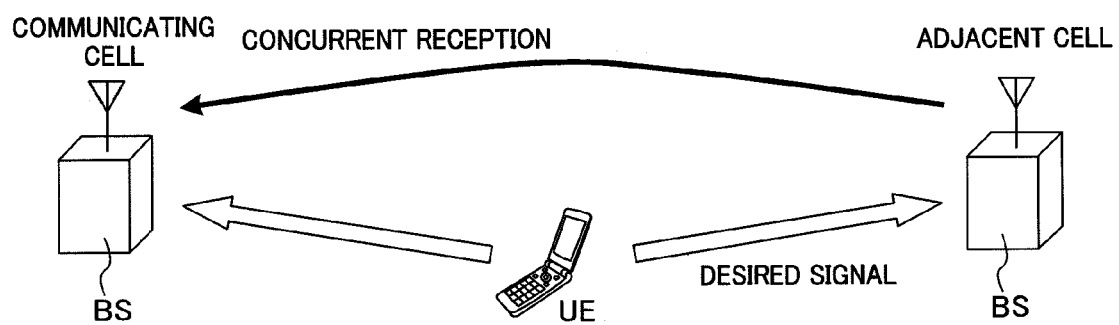
FIG. 27 is a diagram to explain ULCoMP.

At Sheet 21 of 22, Fig. 25, "pass loss" should read path loss

In the Specification:
At column 1, line number 35, "pass loss" should read path loss
At column 1, line number 46, "pass loss" should read path loss
At column 1, line number 61, "pass loss" should read path loss
At column 1, line number 67, "pass loss" should read path loss
At column 2, line number 5, "pass loss" should read path loss
At column 2, line number 6, "pass loss" should read path loss
At column 3, line number 21, "pass loss" should read path loss
At column 3, line number 23, "pass loss" should read path loss
At column 3, line number 25, "pass loss" should read path loss
At column 3, line number 53, "pass loss" should read path loss
At column 3, line number 54, "pass loss" should read path loss
At column 3, line number 56, "pass loss" should read path loss
At column 7, line number 7, "pass loss" should read path loss
At column 7, line number 66, "pass loss" should read path loss
At column 8, line number 15, "pass loss" should read path loss
At column 8, line number 16, "pass loss" should read path loss
At column 8, line number 18, "pass loss" should read path loss
At column 8, line number 21, "pass loss" should read path loss
At column 8, line number 25, "pass loss" should read path loss
At column 8, line number 26, "pass loss" should read path loss
At column 8, line number 28, "pass loss" should read path loss
At column 8, line number 33, "pass loss" should read path loss

CERTIFICATE OF CORRECTION (continued)
U.S. Pat. No. 8,958,355 B2

At column 9, line number 28, "pass loss" should read path loss

At column 9, line number 33, "pass loss" should read path loss

At column 9, line number 36, "pass loss" should read path loss

At column 9, line number 46, "pass loss" should read path loss

At column 9, line number 47, "pass loss" should read path loss

At column 10, line number 2, "pass loss PL and pass loss" should read path loss PL and path loss

At column 10, line number 8, "pass loss" should read path loss

At column 10, line number 10, "pass loss" should read path loss

At column 10, line number 13, "pass loss" should read path loss

At column 10, line number 17, "pass loss" should read path loss

At column 10, line number 19, "pass loss" should read path loss

At column 10, line number 21, "pass loss" should read path loss

At column 10, line number 27, "pass loss" should read path loss

At column 10, line number 28, "pass loss" should read path loss

At column 10, line number 42, "pass loss value $PL_3$ represents a pass loss" should read path loss value $PL_3$ represents a path loss

At column 10, line number 44, "pass loss" should read path loss

At column 11, line number 1, "pass loss" should read path loss

At column 11, line number 4, "pass loss" should read path loss

At column 11, line number 7, "pass loss" should read path loss

At column 11, line number 10, "pass loss" should read path loss

At column 11, line number 14, "pass loss" should read path loss

At column 11, line number 22, "pass loss" should read path loss

At column 11, line number 25, "pass loss" should read path loss

At column 15, line number 1, "pass loss" should read path loss

At column 15, line number 6, "pass loss" should read path loss

At column 15, line number 8, "pass loss" should read path loss

At column 15, line number 11, "pass loss" should read path loss

At column 15, line number 13, "pass loss" should read path loss

At column 15, line number 14, "pass loss obtained in the mobile terminal, the pass loss" should read path loss obtained in the mobile terminal, the path loss

At column 15, line number 15, "pass loss obtained in the mobile terminal or pass loss" should read path loss obtained in the mobile terminal or path loss

At column 15, line number 18, "pass loss" should read path loss

CERTIFICATE OF CORRECTION (continued)
U.S. Pat. No. 8,958,355 B2

At column 15, line number 20, "pass loss" should read path loss

At column 15, line number 42, "pass loss" should read path loss

At column 15, line number 43, "pass loss" should read path loss

At column 15, line number 44, "pass loss" should read path loss

At column 15, line number 48, "pass loss" should read path loss

At column 15, line number 50, "pass loss" should read path loss

At column 15, line number 56, "pass loss" should read path loss

At column 15, line number 59, "pass loss" should read path loss

At column 16, line number 53, "pass loss" should read path loss

At column 17, line number 10, "pass loss" should read path loss

At column 17, line number 11, "pass loss" should read path loss

At column 17, line number 15, "pass loss" should read path loss

At column 17, line number 17, "pass loss" should read path loss

At column 17, line number 18, "pass losses. The pass loss" should read path losses. The path loss

At column 17, line number 19, "pass loss" should read path loss

At column 17, line number 20, "pass loss" should read path loss

At column 17, line number 23, "pass loss" should read path loss

At column 17, line number 27, "pass loss" should read path loss

At column 17, line number 29, "pass loss" should read path loss

At column 17, line number 30, "pass loss" should read path loss

At column 17, line number 32, "pass loss" should read path loss

At column 18, line number 49, "pass loss" should read path toss

At column 18, line number 53, "pass loss" should read path loss

At column 18, line number 55, "pass loss" should read path loss

At column 18, line number 58, "pass loss $PL_1$ is a pass loss" should read path loss $PL_1$ is a path loss

At column 18, line number 60, "pass loss" should read path loss

At column 18, line number 64, "pass loss $PL_1$ and pass loss $PL_2$" should read path loss $PL_1$ and path loss $PL_2$

At column 19, line number 1, "pass loss" should read path loss

At column 19, line number 2, "pass loss" should read path loss

At column 19, line number 9, "pass loss" should read path loss

At column 19, line number 11, "pass loss difference obtained using a pass loss" should read path loss difference obtained using a path loss

CERTIFICATE OF CORRECTION (continued)
U.S. Pat. No. 8,958,355 B2

At column 19, line number 12, "pass loss $PL_1$ and the pass loss $PL_2$" should read path loss $PL_1$ and the path loss $PL_2$

At column 19, line number 16, "pass loss" should read path loss

At column 19, line number 17, "pass loss" should read path loss

At column 19, line number 18, "pass loss" should read path loss

At column 19, line number 20, "pass loss" should read path loss

At column 19, line number 39, "pass loss" should read path loss

At column 19, line number 40, "pass loss" should read path loss

At column 19, line number 42, "pass loss" should read path loss

At column 20, line number 7, "pass loss" should read path loss

At column 20, line number 8, "pass loss" should read path loss

At column 20, line number 11, "pass loss" should read path loss

At column 20, line number 16, "pass loss" should read path loss

At column 20, line number 30, "pass loss" should read path loss

At column 20, line number 31, "pass loss" should read path loss

At column 20, line number 34, "pass loss" should read path loss

At column 20, line number 40, "pass loss" should read path loss

At column 21, line number 29, "pass loss" should read path loss

At column 21, line number 35, "pass loss" should read path loss

At column 21, line number 45, "pass loss" should read path loss

At column 21, line number 54, "pass loss" should read path loss

In the Claims:

At column 23, claim number 1, line number 11, "pass loss" should read path loss

At column 23, claim number 1, line number 14, "pass loss" should read path loss

At column 23, claim number 1, line number 16, "pass loss" should read path loss

At column 23, claim number 1, line number 33, "pass loss difference obtained using a pass loss" should read path loss difference obtained using a path loss

At column 23, claim number 1, line number 34, "first pass loss and a pass loss" should read first path loss and a path loss

At column 24, claim number 1, line number 1, "pass loss" should read path loss

At column 24, claim number 1, line number 2, "pass loss" should read path loss